US011902367B2

(12) United States Patent
Hood et al.

(10) Patent No.: US 11,902,367 B2
(45) Date of Patent: Feb. 13, 2024

(54) COORDINATING INTER-REGION OPERATIONS IN PROVIDER NETWORK ENVIRONMENTS

(71) Applicant: Amazon Technologies, Inc., Seattle, WA (US)

(72) Inventors: Logan Michael Hood, Herndon, VA (US); Jonathan Galentine, Hamilton, VA (US); Vincent Gerard Nicotra, Lansdowne, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/167,793

(22) Filed: Feb. 10, 2023

(65) Prior Publication Data
US 2023/0283661 A1    Sep. 7, 2023

Related U.S. Application Data

(60) Continuation of application No. 17/409,206, filed on Aug. 23, 2021, now Pat. No. 11,582,298, which is a
(Continued)

(51) Int. Cl.
*H04L 67/1087*    (2022.01)
*H04L 12/46*    (2006.01)
*H04L 41/00*    (2022.01)

(52) U.S. Cl.
CPC .......... *H04L 67/1091* (2013.01); *H04L 12/46* (2013.01); *H04L 12/4641* (2013.01); *H04L 41/00* (2013.01)

(58) Field of Classification Search
CPC . H04L 67/1091; H04L 12/46; H04L 12/4641; H04L 41/00
See application file for complete search history.

(56) References Cited

U.S. PATENT DOCUMENTS 6,240,402 B1 * 5/2001 Lynch-Aird ....... G06Q 30/0283
705/400
7,145,898 B1 * 12/2006 Elliott ................... H04L 67/306
379/900
(Continued)

FOREIGN PATENT DOCUMENTS

CN    101442557    5/2009
WO    2015179508    11/2015

OTHER PUBLICATIONS

Amazon Web Services, "Amazon Virtual Private Cloud—VPC Peering Guide", Retrieved from URL: http://docs.aws.amazon.com/AmazonVPC/latest/PeeringGuide/vpc-peering-basics.html on May 4, 2017, pp. 1-57.
(Continued)

*Primary Examiner* — Jimmy H Tran
(74) *Attorney, Agent, or Firm* — Robert C. Kowert; Kowert, Hood, Munyon, Rankin & Goetzel, P.C.

(57) ABSTRACT

Methods and apparatus for coordinating inter-region operations in provider networks. An inter-region coordinator (IRC) operates asynchronously to the control planes of regional networks to coordinate inter-region operations. The IRC in a region may include one or more IRC servers. To perform inter-region operations, the servers may implement a local-remote-local method in which a server invokes an API in the local region to get work, sends the work to a control plane of a remote region, receives a response from the remote region, and informs the control plane in the local region of the status of the work.

20 Claims, 20 Drawing Sheets

Related U.S. Application Data continuation of application No. 16/698,848, filed on Nov. 27, 2019, now Pat. No. 11,102,291, which is a division of application No. 15/587,280, filed on May 4, 2017, now Pat. No. 10,498,810.

(56) References Cited

U.S. PATENT DOCUMENTS

| | | | |
|---|---|---|---|
| 7,325,140 B2* | 1/2008 | Carley | G06F 21/71 |
| | | | 709/224 |
| 7,380,124 B1* | 5/2008 | Mizell | H04L 63/061 |
| | | | 709/200 |
| 7,433,326 B2 | 10/2008 | Desai et al. | |
| 7,505,962 B2* | 3/2009 | Shariff | G06Q 30/02 |
| 7,779,461 B1* | 8/2010 | Liu | H04L 9/40 |
| | | | 713/153 |
| 7,937,438 B1* | 5/2011 | Miller | H04L 45/00 |
| | | | 709/200 |
| 7,945,640 B1* | 5/2011 | VanTine | G06F 3/067 |
| | | | 709/217 |
| 7,949,785 B2* | 5/2011 | Alkhatib | G06Q 30/02 |
| | | | 709/245 |
| 7,953,865 B1* | 5/2011 | Miller | H04L 12/6418 |
| | | | 370/254 |
| 7,991,859 B1* | 8/2011 | Miller | H04L 41/0803 |
| | | | 709/224 |
| 8,117,289 B1* | 2/2012 | Miller | H04L 41/12 |
| | | | 709/227 |
| 8,131,852 B1* | 3/2012 | Miller | H04L 41/0803 |
| | | | 709/227 |
| 8,201,237 B1* | 6/2012 | Doane | H04L 67/52 |
| | | | 713/153 |
| 8,224,931 B1* | 7/2012 | Brandwine | H04L 67/131 |
| | | | 709/227 |
| 8,224,971 B1* | 7/2012 | Miller | H04L 41/5096 |
| | | | 370/254 |
| 8,230,050 B1* | 7/2012 | Brandwine | H04L 41/0803 |
| | | | 709/220 |
| 8,239,538 B2* | 8/2012 | Zhang | H04L 67/1001 |
| | | | 718/1 |
| 8,312,129 B1* | 11/2012 | Miller | H04L 41/12 |
| | | | 709/227 |
| 8,345,692 B2* | 1/2013 | Smith | H04L 12/462 |
| | | | 370/396 |
| 8,352,941 B1* | 1/2013 | Protopopov | H04L 63/102 |
| | | | 718/1 |
| 8,601,134 B1* | 12/2013 | Sorenson, III | H04L 67/141 |
| | | | 709/227 |
| 8,605,624 B2 | 12/2013 | Desai et al. | |
| 8,611,359 B1* | 12/2013 | Kompella | H04L 45/04 |
| | | | 370/401 |
| 8,625,603 B1* | 1/2014 | Ramakrishnan | H04L 49/201 |
| | | | 370/395.3 |
| 8,843,636 B1* | 9/2014 | Wu | H04L 69/04 |
| | | | 709/233 |
| 8,959,185 B2* | 2/2015 | Nakil | H04L 41/12 |
| | | | 709/219 |
| 9,112,769 B1* | 8/2015 | Fitzgerald | H04L 41/0896 |
| 9,178,809 B1* | 11/2015 | Shen | H04L 12/4633 |
| 9,461,996 B2* | 10/2016 | Hayton | G06F 21/00 |
| 9,497,040 B1* | 11/2016 | Miller | H04L 12/66 |
| 9,560,016 B2* | 1/2017 | Zhang | H04L 61/2514 |
| 9,641,450 B1* | 5/2017 | Brandwine | H04L 47/70 |
| 9,692,692 B1* | 6/2017 | Vairavakkalai | H04L 45/745 |
| 9,699,116 B2* | 7/2017 | Zhang | H04L 45/42 |
| 9,710,292 B2* | 7/2017 | Anderson | G06F 9/45558 |
| 9,781,259 B1* | 10/2017 | Kodaypak | H04L 67/61 |
| 9,807,057 B1* | 10/2017 | Deb | H04L 63/0272 |
| 9,811,365 B2* | 11/2017 | Borthakur | G06F 9/45558 |
| 9,838,337 B1* | 12/2017 | Pinnamraju | H04L 12/4641 |
| 10,326,710 B1* | 6/2019 | Hashmi | G06F 9/45558 |
| 10,367,655 B2* | 7/2019 | Cheng | H04L 12/462 |
| 10,498,810 B2 | 12/2019 | Hood et al. | |
| 10,862,796 B1* | 12/2020 | Dickinson | H04L 45/64 |
| 11,102,291 B2 | 8/2021 | Hood et al. | |
| 11,582,298 B2 | 2/2023 | Hood et al. | |
| 2002/0136167 A1* | 9/2002 | Steele | H04M 3/4228 |
| | | | 370/352 |
| 2003/0084104 A1* | 5/2003 | Salem | H04L 67/02 |
| | | | 709/219 |
| 2004/0006708 A1* | 1/2004 | Mukherjee | H04L 63/0272 |
| | | | 709/227 |
| 2004/0100910 A1 | 5/2004 | Desai et al. | |
| 2004/0252698 A1* | 12/2004 | Anschutz | H04L 47/785 |
| | | | 370/395.21 |
| 2005/0198244 A1* | 9/2005 | Eilam | G06F 9/5061 |
| | | | 709/225 |
| 2007/0140250 A1* | 6/2007 | McAllister | H04L 45/00 |
| | | | 370/392 |
| 2008/0307519 A1* | 12/2008 | Curcio | H04L 69/161 |
| | | | 726/15 |
| 2008/0316942 A1 | 12/2008 | Desai et al. | |
| 2009/0109959 A1* | 4/2009 | Elliott | H04L 63/102 |
| | | | 370/352 |
| 2009/0262741 A1* | 10/2009 | Jungck | H04L 47/24 |
| | | | 370/392 |
| 2009/0304003 A1* | 12/2009 | Huynh Van | H04L 12/4641 |
| | | | 370/395.31 |
| 2009/0304004 A1* | 12/2009 | Huynh Van | H04L 12/4641 |
| | | | 370/395.31 |
| 2010/0057831 A1* | 3/2010 | Williamson | G06F 9/5027 |
| | | | 707/E17.044 |
| 2010/0103837 A1* | 4/2010 | Jungck | H04L 61/4511 |
| | | | 370/252 |
| 2010/0115606 A1* | 5/2010 | Samovskiy | H04L 63/0272 |
| | | | 709/250 |
| 2010/0246443 A1* | 9/2010 | Cohn | H04L 45/76 |
| | | | 370/255 |
| 2011/0066728 A1* | 3/2011 | Gauthier | H04L 43/0817 |
| | | | 709/226 |
| 2011/0110377 A1* | 5/2011 | Alkhatib | H04L 61/2503 |
| | | | 370/395.53 |
| 2011/0277027 A1* | 11/2011 | Hayton | G06F 21/554 |
| | | | 726/8 |
| 2011/0296052 A1* | 12/2011 | Guo | H04L 45/76 |
| | | | 718/1 |
| 2011/0320605 A1* | 12/2011 | Kramer | H04L 41/0843 |
| | | | 709/226 |
| 2012/0084113 A1* | 4/2012 | Brandwine | G06Q 10/06312 |
| | | | 705/7.22 |
| 2012/0084443 A1* | 4/2012 | Theimer | H04L 41/5051 |
| | | | 709/226 |
| 2012/0110188 A1* | 5/2012 | Van Biljon | G06Q 30/04 |
| | | | 709/226 |
| 2012/0179819 A1* | 7/2012 | Hanson | H04L 41/0893 |
| | | | 709/225 |
| 2013/0166709 A1* | 6/2013 | Doane | H04L 45/02 |
| | | | 709/223 |
| 2013/0205042 A1* | 8/2013 | Cohn | H04L 45/586 |
| | | | 709/238 |
| 2013/0263256 A1* | 10/2013 | Dickinson | H04L 63/1416 |
| | | | 726/22 |
| 2013/0332577 A1* | 12/2013 | Nakil | H04L 49/70 |
| | | | 709/219 |
| 2014/0108665 A1* | 4/2014 | Arora | H04L 67/563 |
| | | | 709/227 |
| 2014/0140350 A1* | 5/2014 | Uttaro | H04L 45/126 |
| | | | 370/401 |
| 2014/0250217 A1* | 9/2014 | Miller | H04L 9/40 |
| | | | 709/223 |
| 2014/0280595 A1* | 9/2014 | Mani | H04L 67/10 |
| | | | 709/204 |
| 2014/0282817 A1* | 9/2014 | Singer | H04L 63/08 |
| | | | 726/1 |
| 2014/0325637 A1* | 10/2014 | Zhang | H04L 63/0272 |
| | | | 726/15 |
| 2014/0330784 A1* | 11/2014 | Sundaram | G06F 16/27 |
| | | | 707/639 |

(56) References Cited

U.S. PATENT DOCUMENTS

| | | | | |
|---|---|---|---|---|
| 2014/0334286 | A1* | 11/2014 | Ernstrom | H04L 45/50 370/216 |
| 2014/0337500 | A1* | 11/2014 | Lee | H04L 41/122 709/223 |
| 2014/0372381 | A1* | 12/2014 | Sorenson, III | H04L 67/1097 707/649 |
| 2015/0010008 | A1* | 1/2015 | Huynh Van | H04L 45/17 370/395.53 |
| 2015/0040125 | A1* | 2/2015 | Anderson | G06F 9/45558 718/1 |
| 2015/0074259 | A1* | 3/2015 | Ansari | H04L 12/2834 709/224 |
| 2015/0096011 | A1* | 4/2015 | Watt | G06F 3/0647 726/15 |
| 2015/0104170 | A1* | 4/2015 | Xia | H04J 14/0227 398/48 |
| 2015/0200960 | A1* | 7/2015 | Dickinson | H04L 63/1416 726/23 |
| 2015/0244617 | A1* | 8/2015 | Nakil | H04L 41/0897 709/224 |
| 2015/0249569 | A1* | 9/2015 | Brandwine | H04L 41/0803 709/220 |
| 2015/0324215 | A1* | 11/2015 | Borthakur | G06F 9/45558 718/1 |
| 2015/0334054 | A1* | 11/2015 | Miller | H04L 45/02 709/228 |
| 2015/0339136 | A1* | 11/2015 | Suryanarayanan | G06F 9/452 718/1 |
| 2015/0350012 | A1* | 12/2015 | Miller | H04L 67/51 709/220 |
| 2015/0350021 | A1 | 12/2015 | Morris | |
| 2015/0350314 | A1* | 12/2015 | Miller | H04L 9/40 709/203 |
| 2016/0066355 | A1* | 3/2016 | Chakraborty | H04W 4/21 348/143 |
| 2016/0080317 | A1* | 3/2016 | Brandwine | H04L 67/565 709/245 |
| 2016/0134548 | A1* | 5/2016 | Jungck | H04L 61/4511 370/230 |
| 2016/0218917 | A1* | 7/2016 | Zhang | H04L 45/42 |
| 2016/0232521 | A1* | 8/2016 | Sharp | G06Q 20/3229 |
| 2016/0301608 | A1* | 10/2016 | Natarajan | H04L 12/2865 |
| 2016/0337174 | A1* | 11/2016 | Jorm | H04L 41/5041 |
| 2017/0078410 | A1* | 3/2017 | Rao | H04L 41/20 |
| 2017/0124021 | A1* | 5/2017 | Brown | H04L 43/0888 |
| 2017/0195132 | A1* | 7/2017 | Burgio | H04L 12/46 |
| 2017/0223117 | A1* | 8/2017 | Messerli | H04L 47/783 |
| 2017/0302535 | A1* | 10/2017 | Lee | H04L 63/0272 |
| 2017/0324828 | A1* | 11/2017 | Clavera | H04L 67/131 |
| 2017/0346657 | A1* | 11/2017 | Huynh Van | H04L 9/30 |
| 2018/0013624 | A1* | 1/2018 | Miller | H04L 45/00 |
| 2018/0054421 | A1 | 2/2018 | Deb | |
| 2018/0069797 | A1* | 3/2018 | Williams | H04L 63/0272 |
| 2018/0139073 | A1* | 5/2018 | Han | H04L 12/4633 |
| 2018/0173557 | A1* | 6/2018 | Nakil | H04L 41/0631 |
| 2018/0285166 | A1* | 10/2018 | Roy | H04L 41/0895 |
| 2018/0287905 | A1* | 10/2018 | Mehta | H04L 47/2483 |
| 2019/0005576 | A1* | 1/2019 | Mick | H04L 41/5054 |
| 2019/0213649 | A1* | 7/2019 | Van Biljon | H04L 63/0236 |
| 2019/0253454 | A1* | 8/2019 | Williams | H04L 12/4633 |
| 2019/0394656 | A1* | 12/2019 | Maria | H04L 41/0816 |
| 2020/0213153 | A1* | 7/2020 | Rubenstein | H04L 45/12 |
| 2020/0228444 | A1* | 7/2020 | Parasmal | H04L 65/80 |
| 2020/0244572 | A1* | 7/2020 | Mysyk | H04L 61/5007 |
| 2020/0382341 | A1* | 12/2020 | Oré | H04L 63/0254 |
| 2021/0067579 | A1* | 3/2021 | Rubenstein | H04L 61/4511 |
| 2021/0111998 | A1* | 4/2021 | Saavedra | H04L 63/166 |
| 2021/0174411 | A1* | 6/2021 | Van Biljon | H04L 63/101 |
| 2021/0352017 | A1* | 11/2021 | Williams | H04L 12/4633 |
| 2022/0158867 | A1* | 5/2022 | Rubenstein | H04L 45/64 |
| 2022/0191062 | A1* | 6/2022 | Rubenstein | H04L 63/0263 |
| 2023/0075806 | A1* | 3/2023 | Rubenstein | H04L 63/0281 |

OTHER PUBLICATIONS

Wikipedia, "Virtual Private Networks," Aug. 2008, pp. 1-8.
Extended European Search Report dated May 11, 2022 in European Patent Application No. 21196283.2.
Amazon Web Service, "Amazon Virtual Private Cloud User Guide", API Version, Jun. 15, 2014, pp. 1-162.
Amazon Web Service, "Amazon Elastic Compute Cloud User Guide for Linux", API Version, Jun. 15, 2014, pp. 1-685.
International Search Report and Written Opinion from PCT/US2018/027279, dated Jun. 27, 2018, Amazon Technologies, Inc., pp. 1-12.
Office action from Chinese Application No. 201880029416.2, (English translation and Chinese Version), dated Feb. 3, 2021, pp. 1-11.

* cited by examiner

LEGEND:
○ process start
⬡ process end
→ asynchronous request
--→ asynchronous response
→ synchronous request
--→ synchronous response

COORDINATING INTER-REGION OPERATIONS IN PROVIDER NETWORK ENVIRONMENTS

This application is a continuation of U.S. patent application Ser. No. 17/409,206, filed Aug. 23, 2021, which is a continuation of U.S. patent application Ser. No. 16/698,848, filed Nov. 27, 2019, now U.S. Pat. No. 11,102,291, which is a divisional of U.S. patent application Ser. No. 15/587,280, filed May 4, 2017, now U.S. Pat. No. 10,498,810, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for inter-region peering between private networks in different regional networks of a provider network are described. Embodiments of methods and apparatus for inter-region peering may, for example, be implemented in the context of a provider network that provides virtual resources such as computing resources executing as virtual machines (VMs), as well as other virtual resources such as virtual storage, to customers via an intermediate network such as the Internet. The provider network may include multiple regional networks; each regional network may correspond to and cover a separate and distinct geographic region. Each regional network may include a network substrate and a control plane implemented by one or more data centers, and each regional network may host one or more services and application programming interfaces (APIs) that allow customers to establish, provision, and manage their virtualized resources in virtualized private networks (referred to herein as private networks) within the respective regional network.

The regional networks may be connected by a network backbone that allows high-speed, secure transit of traffic between the regional networks. However, to achieve a desired level of fault tolerance and stability in the provider network, each regional network may be independent of and isolated from the other regional networks. To prevent impacts in one regional network from affecting other regional networks, there should not be dependencies between the network substrates and control planes in the regional networks. For example, control plane processes in one regional network should not communicate directly with control plane processes in another regional network. Further, each regional network hosts its own instances of the services and APIs that allow customers to establish, provision, and manage their virtualized resources in private networks only within the respective regional network.

In physical network environments, two private data centers may be peered with each other via physical cables that are connected or "patched" between the data centers, for example at a transit center or the like. A border routing protocol may be used to exchange information about the private networks at the data centers (e.g., private network address ranges to be used in the peering).

Figure 1:
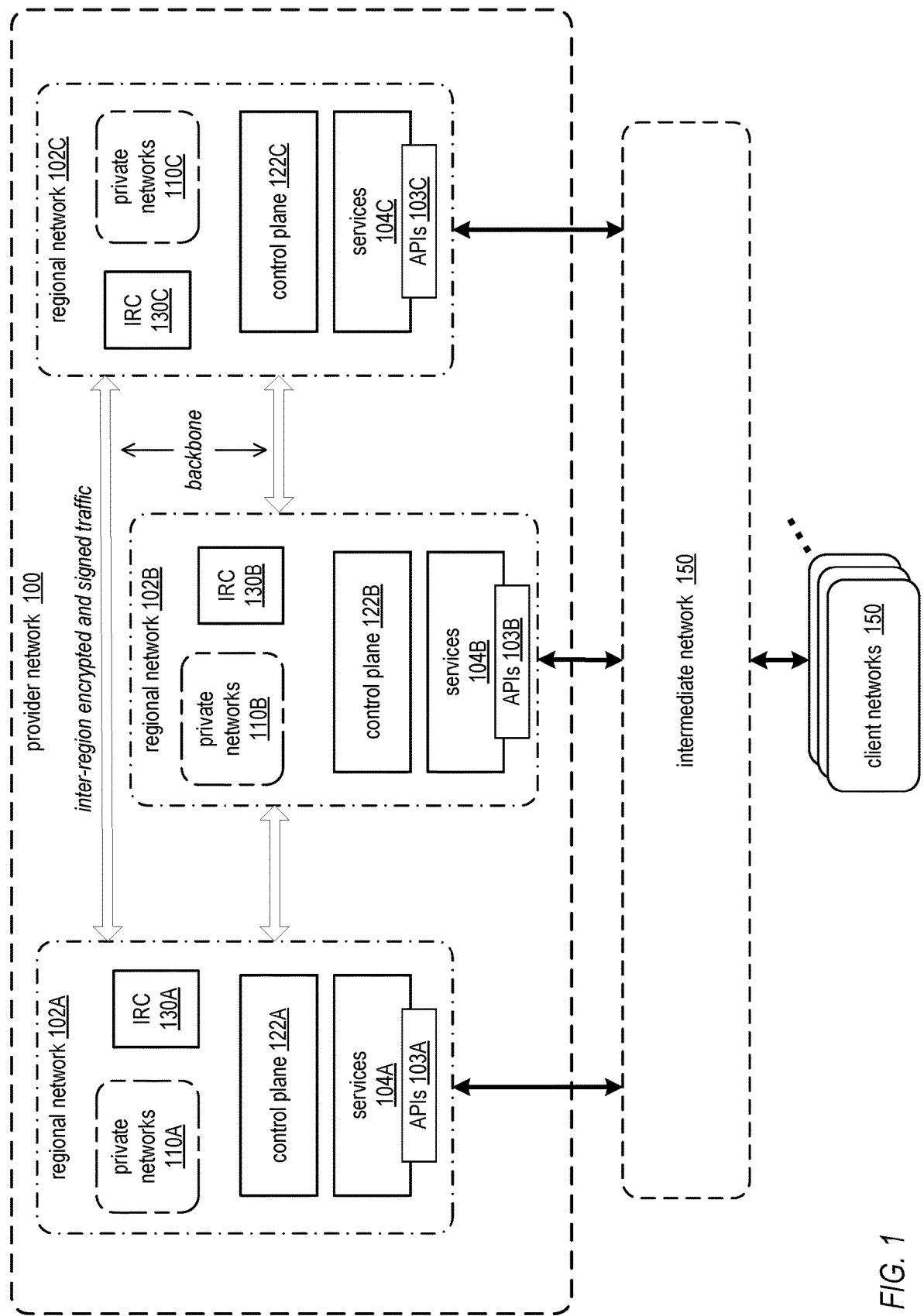
FIG. 1 illustrates an example provider network environment in which embodiments of the methods and apparatus for inter-region peering may be implemented.

In virtual network environments that allow clients to provision virtual private networks, for example provider networks as illustrated in FIG. 1, the clients' virtual private network(s) are discrete, routed IP containers that are hosted on the regional networks of the provider network and that may be viewed as virtual analogs to physical data centers. Packet flows between endpoints (e.g., customers' virtual resources) in different private networks on a regional network are routed through the network substrate of the regional network to an intermediate public network such as the Internet. The intermediate network routes the packets back to the regional network. On the regional network, the packets are routed over the network substrate to the destination private network.

To provide a virtual analog to physical transit centers at which physical cables between data centers are patched to create a peering between the respective private networks at the data centers in virtual network environments within regional networks of a provider network, a peering service and API may be provided that allow customers to request virtual peerings between their private networks on a regional network and other private networks on the same regional network, and that allows customers to accept peering requests for their private networks on the regional network. Virtual peerings between private networks on a regional network may be referred to herein as intra-region peerings. Upon acceptance of a request for a virtual peering between two private networks on the regional network, an intra-region peering is established by the regional network's control plane; the intra-region peering allows packets to flow between endpoints in the two private networks over the regional network's network substrate without passing through the intermediate public network. Note that the peering service and API may support cross-customer intra-region peerings, in which case two different customers who respectively own two different private networks in the regional network establish a peering between the two virtual networks in the regional network, and may also support same-customer intra-region peerings, in which case the same customer who owns two private networks in the regional network establishes a peering between the customer's two virtual networks in the regional network.

However, conventionally, virtual network environments have not provided peering between private networks in different regional networks (referred to herein as inter-region peering). Thus, conventionally all traffic between customers' private networks in different regional networks transits an intermediate public network such as the Internet, which exposes the customers' virtual resources and traffic on the public network. Customers who want to secure their data in transit between regional networks have to run their own virtual private network (VPN) devices, which can be expensive, add to the operational complexity of the customers' private network implementations, and does not provide the availability characteristics customers need. One reason why inter-region peering has not been provided by the provider network services is that supporting inter-region peering requires coordination between the control planes in the regional networks, and as mentioned above, to prevent impacts in one regional network from affecting other regional networks, there should be no dependencies between the control planes in the regional networks. For example, control plane processes in one regional network should not communicate directly with control plane processes in another regional network to coordinate peerings between private networks.

Embodiments of methods and apparatus for inter-region peering between private networks in different regional networks of a provider network are described that allow customers to establish virtual peerings between private networks in different regional networks without requiring dependencies between the control planes in the regional networks. Embodiments may support cross-customer inter-region peerings, in which case two different customers who respectively own two different private networks in different regional networks establish an inter-region peering between the customers' private networks in the different regions, and may also support same-customer inter-region peerings, in which case a customer who owns the two different private networks in the local and remote regional networks establishes an inter-region peering between the customer's private networks in the different regions. Embodiments of an inter-region coordinator (IRC) service are described that operates asynchronously to the control plane processes of the regional networks to coordinate the establishment and management of peerings between private networks in the regional networks. By using the IRC to coordinate inter-region peerings, the control planes of the regional networks do not have to directly communicate and dependencies between the control planes are not required.

Figure 14:
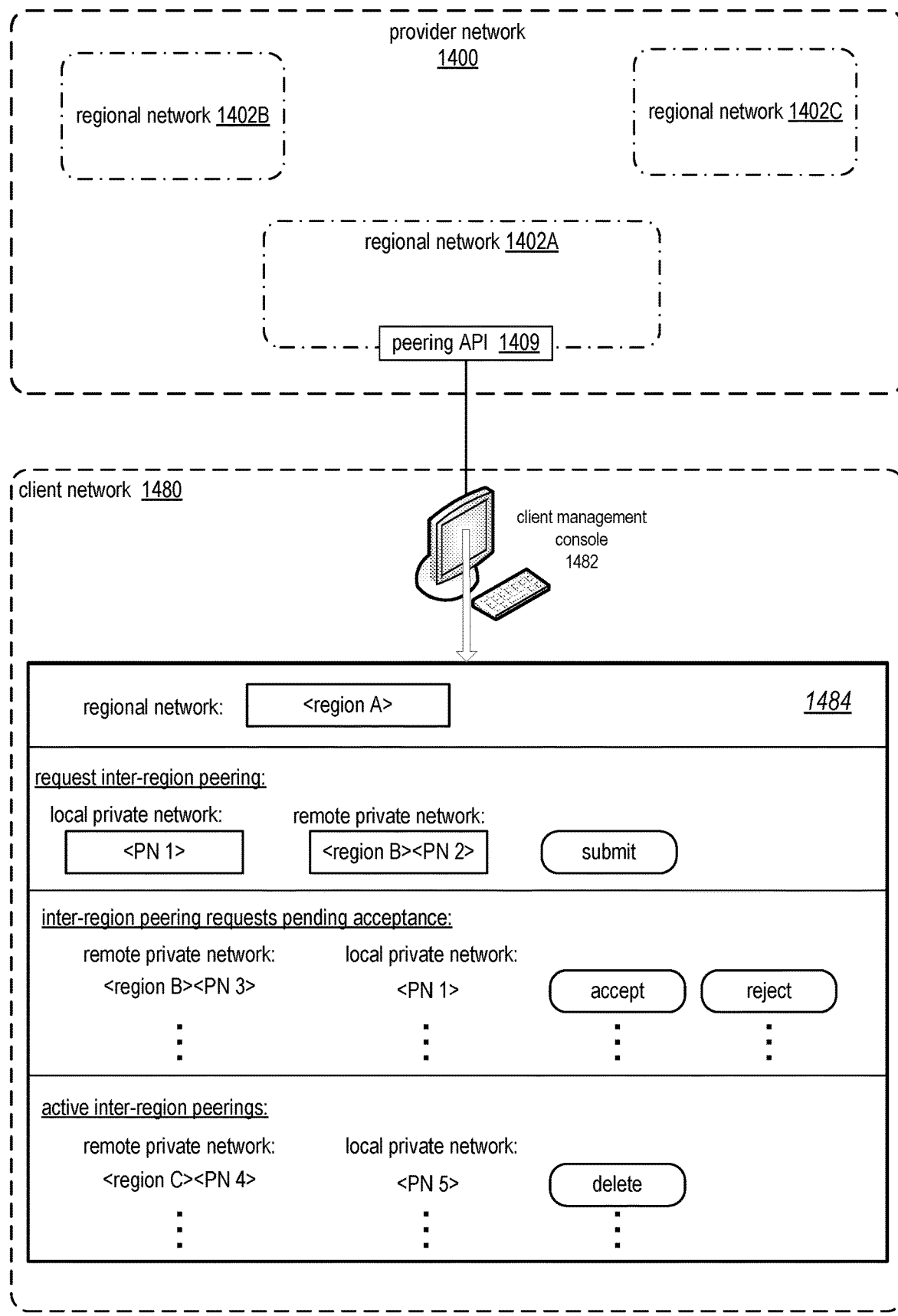
FIG. 14 shows an example inter-region peering interface, according to some embodiments.

In some embodiments, each regional network may include an IRC service implementation. The IRC service in a given regional network may include a fleet of one or more IRC servers, for example implemented as VMs on the regional network by the same service and technology that provides VM resources to customers of the provider network. Each regional network may also provide an inter-region peering service and an inter-region peering API via which customers can request inter-region peerings for their private networks in the regional network, and via which customers can also accept requests for inter-region peerings for their private networks in the regional network. In some embodiments, the inter-region peering API may also allow customers to reject inter-region peering requests, and to delete existing inter-region peerings for their respective private networks. FIG. 14 shows an example interface to the inter-region peering API that may be displayed on a customer's console.

In each regional network, to perform inter-region peering operations, the IRC service may implement a local-remote-local method or process in which an IRC server invokes an API to a control plane process of the local regional network to get work (e.g., create peering, accept peering, delete peering, etc.), invokes an API to a control plane process of a remote regional network to notify the remote control plane process of the work to be done (e.g., create peering, accept peering, delete peering, etc.), and then invokes an API to a control plane process of the local regional network to inform the control plane process that the work has been done. While the IRC service and the local-remote-local method implemented by the IRC service are described herein in reference to coordinating inter-region peerings on behalf of the control planes, note that the IRC service and/or the local-remote-local method as described herein may be used to coordinate other types of operations between the regional networks of a provider network, or more generally between the control planes of any two independent networks.

The following describes operations of an IRC service in establishing an inter-region peering between private networks in different regional networks, according to some embodiments. Note that embodiments may support cross-customer inter-region peerings, in which case the local and remote customers are different customers who respectively own the two different private networks in the local and remote regional networks, and may also support same-customer inter-region peerings, in which case the local and remote customers are the same customer who owns the two different private networks in the local and remote regional networks.

An inter-region peering request received from a customer according to the peering API, for example via an interface to the peering API as shown in FIG. 14, specifies a private network of the respective customer on the respective regional network (referred to as the local regional network) and another private network in a different regional network (referred to as the remote regional network) to which the customer (referred to as the local customer) wants to establish a peering. In some embodiments, upon receiving an inter-region peering request from a local customer, the peering API forwards the request to a control plane process of the local regional network. The control plane process of the local regional network creates an inter-region peering record for the inter-region peering request, and generates an entry for the inter-region peering request (referred to as a create peering record) in an inter-region peering work log for the local regional network. In some embodiments, for security, the create peering record may be signed and encrypted.

The IRC servers on the local regional network periodically or aperiodically request work from the work log via an API. Upon obtaining the create peering record, an IRC server on the local regional network invokes an API on the remote regional network specified by the create peering record to send the inter-region peering request to the remote regional network. On the remote regional network, the API forwards the inter-region peering request to a control plane process of the remote regional network, which creates an inter-region peering record for the inter-region peering request that indicates the peering request is pending acceptance. In some embodiments, the control plane process of the remote regional network may notify the owner of the target private network on the remote regional network (referred to as the remote customer) that the local customer has requested a peering between a private network on the local regional network and the remote customer's private network on the remote regional network, for example by displaying an indication of the inter-region peering request on the remote customer's console according to the peering API of the remote regional network as shown in FIG. 14. A response is sent from the remote regional network to the IRC server on the local regional network indicating that the inter-region peering request is pending acceptance. The IRC server invokes an API to notify the control plane process on the local regional network that the inter-region peering request is pending acceptance on the remote regional network. The control plane process updates the inter-region peering record for the inter-region peering request to indicate that it is pending acceptance, and marks the create peering record in the inter-region work log as complete. In some embodiments, the local customer may then be informed by the peering API that the inter-region peering request is pending acceptance on the remote regional network, for example by displaying an indication of the pending inter-region peering request on the local customer's console according to the peering API of the local regional network as shown in FIG. 14.

As previously mentioned, each regional network may provide an inter-region peering API via which customers can request inter-region peerings for their private networks on the region, and via which customers can also accept requests for inter-region peerings for their private networks on the region, for example via an interface as shown in FIG. 14. After being informed by the peering API that the local customer has requested a peering between a private network on the local regional network and the remote customer's private network on the remote regional network, for example by the inter-region peering request being displayed on the interface to the peering API as shown in FIG. 14, the remote customer may accept or reject the inter-region peering request via the peering API, or may simply ignore the request.

In some embodiments, upon receiving an accept inter-region peering request from the remote customer, the peering API forwards the accept request to a control plane process of the remote regional network. The control plane process of the remote regional network updates the inter-region peering record for the inter-region peering request to indicate that the peering is being provisioned, and generates an entry (referred to as an accept peering record) in an inter-region peering work log for the remote regional network. In some embodiments, for security, the accept peering record may be signed and encrypted.

The IRC servers on the remote regional network periodically request work from the work log via an API. Upon obtaining the accept peering record, an IRC server on the remote regional network invokes an API on the local regional network specified by the accept peering record to notify the local regional network that the peering has been accepted. On the local regional network, the API forwards the accept peering message to the control plane process of the local regional network, which updates the inter-region peering record for the inter-region peering request to indicate that the peering is active and provisions the inter-region peering in the local regional network, for example by pushing information for the inter-region peering to the local regional network's edge devices. A response is sent from the local regional network to the IRC server on the remote regional network indicating that the inter-region peering is active on the local regional network. The IRC server invokes an API to notify the control plane process on the remote regional network that the inter-region peering is active on the local regional network. The control plane process updates the inter-region peering record on the remote regional network to indicate that the inter-region peering is active and provisions the inter-region peering in the remote regional network, for example by pushing information for the inter-region peering to the remote regional network's edge devices. The control plane may also mark the accept peering record in the inter-region work log as complete.

In some embodiments, the local-remote-local method described above for requesting inter-region peerings (create peering operations) and accepting inter-region peerings (accept peering operations) may also be used for other inter-region peering operations handled by the IRC service, including but not limited to rejecting inter-region peering requests, deleting active inter-region peerings, handling expired peering requests (peering requests that have been waiting for acceptance for longer than a threshold amount of time), and verifying consistency of the inter-region peering records between regional networks. Create peering, accept peering, reject peering, and delete peering operations are customer-driven operations, and collectively may be referred to as "drive to completion" operations. Thus, the IRC service may be viewed as performing three types of work: drive to completion operations, expired peering operations, and verify consistency operations.

As mentioned above, in some embodiments, the IRC service in a given regional network may include a fleet of one or more IRC servers, for example implemented as VMs on the regional network by the same service and technology that provides VM resources to customers of the provider network. Each IRC server within a regional network's IRC fleet may include separate thread pools for each other regional network that it coordinates with; having separate thread pools for each other regional network may help prevent problems in one remote regional network from impacting coordination with other remote regional networks. In each regional network, there may be n−1 thread pools, where n is the number of regional networks. Threads in each thread pool coordinate inter-region operations with the remote regional network corresponding to the thread pool.

In some embodiments, the rate of inter-region API calls performed by the IRC servers within a regional network may be controlled using a constant work method in which the IRC servers get inter-region peering work to be done at a constant rate (referred to as transactions per second, or TPS). A TPS may be set for the IRC service within a regional network, and the TPS for the regional network may be subdivided among the IRC servers. For example, given a TPS T for a regional network, and given that there are m IRC servers in the regional network, then the TPS for each IRC server may be T/m.

In some embodiments, the constant rate of work may be filled with configurable weighted proportions of the above-mentioned three types of work (drive to completion, expired peerings, and verify consistency). When an IRC server is ready to do work according to its TPS, it must first get inter-region work to do. To get work the IRC server calls an API and specifies the type of work it wants to retrieve. In some embodiments, the IRC server randomly selects the type of work to be performed based on configurable weighted proportions. This random selection of work may converge on the configured percentages over time. This method may, for example, prevent drive to completion operations from starving expired peering operations. If an IRC server randomly selects to perform a drive to completion operation, but there is no drive to completion work to be done, the IRC server may instead perform a verify consistency operation. This may help to maintain a constant rate of inter-region peering API calls.

As previously mentioned, the IRC service in a given regional network may include a fleet of one or more IRC servers. In some embodiments, the IRC servers may be implemented as VMs on the regional network by the same virtualization service and technology that provides VM resources and private networks to customers of the provider network to take advantage of the virtualized infrastructure provided by the virtualization service. However, the virtualized infrastructure provided by the virtualization service may be untrusted. Thus, to protect the IRC service from potential abuse (e.g., if the IRC service's account with the virtualization service is compromised), at least some of the inter-region peering data that passes through the IRC servers may be signed and encrypted by the control plane before being passed to the IRC servers. For example, work items retrieved from the inter-region peering work log may be signed and encrypted before going to an IRC server, and remain signed and encrypted when passed to a remote regional network via its API. Thus, the inter-region peering information contained in the work items (e.g., information identifying and describing the local and remote private networks that are to be peered) is not accessible, and is not accessed, by the IRC servers. Control plane processes in a regional network sign and encrypt inter-region peering information before it passes to the IRC service to be forwarded to another regional network, and control plane processes in a regional network decrypt inter-region peering information after receiving the information from the IRC service on another regional network.

Upon an inter-region peering request being accepted, a virtual inter-region peering may be provisioned on the two regional networks. In some embodiments, provisioning inter-region peering on the regional networks may include pushing information about the inter-region peering from the control plane to the edge devices in the two regional networks. In some embodiments, provisioning inter-region peering on the regional networks may include establishing or configuring a virtual peering process for each virtual network on their respective regional networks; the virtual peering processes may be viewed as a virtual analog to a physical transit center or Internet gateway. A virtual peering process may implement one or more virtual ports that may be logically connected to virtual ports on another virtual peering process to establish a peering connection; a peering connection may be viewed as a virtual analog to a physical cable connecting peered physical networks. A peering connection passes over the network substrate in each regional network to an edge device of the respective regional network, and passes between the two regional networks over a provider network backbone that connects the regional networks. By passing the peering connection over the backbone between the regional networks' edge devices, the traffic on the peering connection between the two private networks does not pass over a public network such as the Internet. However, in an alternative embodiment, the peering connection may instead pass through a secure connection (e.g., a virtual private network (VPN) connection) over an intermediate network such as the Internet. Once a peering connection is established between two private networks in different regional networks, routes to the peering connection may be set up in the two private networks by the respective customers, and endpoints in the two private networks may then begin communicating over the peering connection as if the two private networks were connected by a physical cable. For security, traffic on the peering connection between the two edge devices may be signed and encrypted by the edge devices.

FIG. 1 illustrates an example provider network environment in which embodiments of the methods and apparatus for inter-region peering may be implemented. A provider network 100 may include multiple regional networks 102 (e.g., three regional networks 102A-102C in this example). Each regional network 102 may correspond to a separate and distinct geographic region, and regional networks 102 may be distributed across a state, country, or worldwide. To achieve a desired level of fault tolerance and stability in the provider network 100, each regional network 102 is independent of and logically isolated from the other regional networks 102 in the provider network 100. Communications between endpoints (e.g., customers' virtual resources) in different regional networks 102 typically transit an intermediate network 150 such as the Internet.

In some embodiments, data centers in each regional network 102 of the provider network 100 may implement an overlay network on a network substrate that may, for example, use an encapsulation protocol technology for communications between entities in the regional network 102. In encapsulation protocol technology, network packets may be generated by a packet source in the regional network 102 such as a VM executing on a host device, or may be received by an edge device of the regional network 102 from a source external to the regional network 102. The network packets may be wrapped or encapsulated at an encapsulation layer according to an encapsulation protocol to produce encapsulation protocol packets (also referred to herein as encapsulation packets or network substrate packets). The encapsulation packets may then be routed over the network substrate to a destination in the regional network 102 such as a host device that executes VMs or an edge device of the regional network 102 according to routing information for the encapsulation packets. The routing of the encapsulation packets over the network substrate according to the encapsulation information may be viewed as sending the encapsulation packets via overlay network routes or paths over the network substrate. At the destination, the encapsulation layer removes the network packets from the encapsulation packets (a process referred to as decapsulating) and provides or sends the decapsulated network packets to the network packet destination. For example, if the destination is a host device in the regional network 102, the host device may provide the network packet to a VM executing on the host device; if the destination is an edge device of the regional network 102, the edge device may send the network packet on to the intermediate network 140 to be routed to an external endpoint, such as an endpoint on a client network 150 or an endpoint in another regional network 102.

Figure 4:
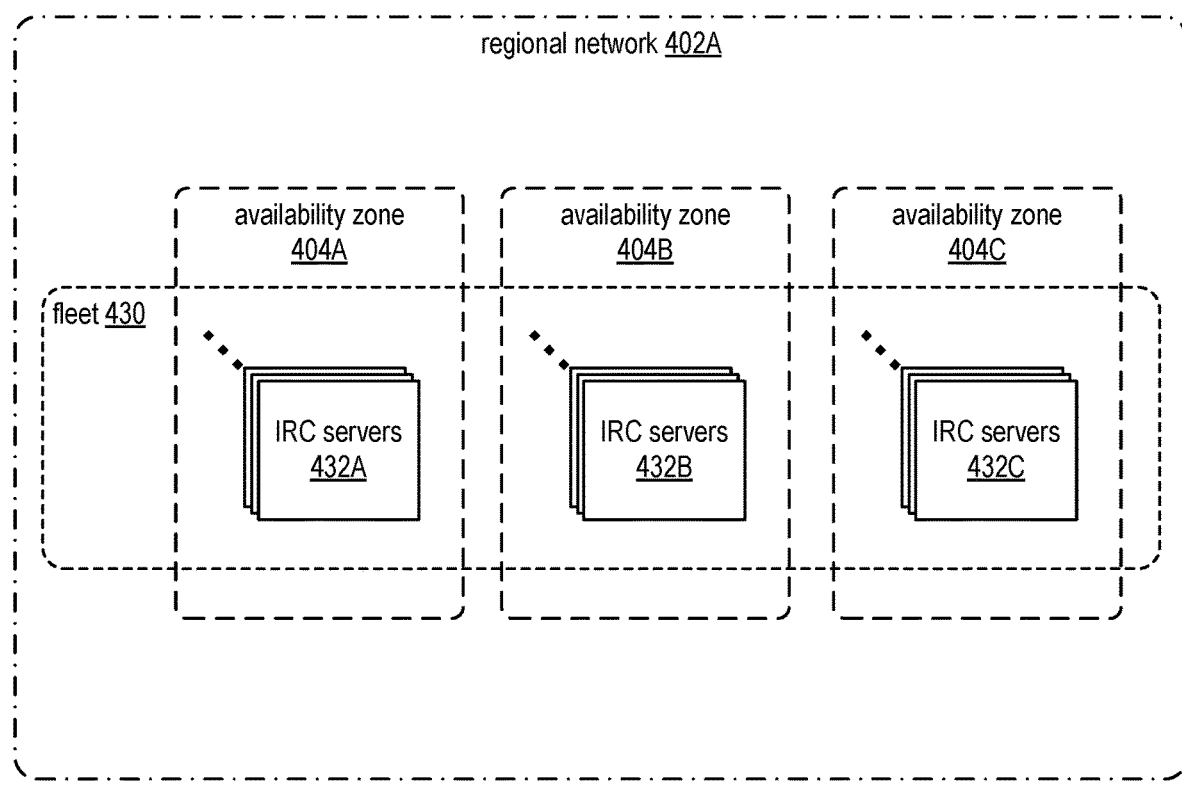
FIG. 4 illustrates a fleet of inter-region coordinator (IRC) servers implemented as virtual machines distributed across zones in a regional network of a provider network, according to some embodiments.

While not shown in FIG. 1, in some embodiments, each regional network 102 may include multiple availability zones, for example as shown in FIG. 4. Each availability zone may be implemented by one or more data centers within the respective regional network 102; a data center may implement one or more availability zones. The availability zones in a regional network 102 may be connected through low-latency links (e.g., dedicated high-bandwidth fiber-optic links) and collectively form the regional network 102. Communications between endpoints (e.g., customers' virtual resources) in different availability zones within a region 102 may go over an intermediate network 150 such as the Internet or over the low-latency links. In some embodiments, the services 104 may provide replication of a customer's virtual resources across two or more availability zones within a respective regional network 102. By replicating a customer's virtual resources across availability zones within a regional network 102, the customer's virtual resources may remain available in another availability zone in the regional network 102 if one availability zone goes down for some reason. However, since the regional networks 102 of the provider network 100 are independent and logically isolated, the services 104 do not extend across regional networks 102 and do not provide replication of a customer's virtual resources across regional networks 102. To create or replicate resources in another regional network 102, the customer has to access the services 104 hosted in that regional network 102.

As shown in FIG. 1, each regional network 102 may include a control plane 122 that includes devices and processes that handle routing of traffic between endpoints on the regional network 102 over the network substrate. Functions of the control plane 122 also include network substrate configuration and management. As shown in FIG. 1, services 104 and APIs 103 may be hosted in each regional network 102; the services 104 and APIs 103 provide an interface between customers and the control plane 122 functionality. For example, using the services 104 and APIs 103 in a regional network 102, a customer may implement and manage virtual resources in private networks 110 on the regional network 102.

In some embodiments, each regional network 102 may include an IRC 130 service implementation. The IRC 130 in a given regional network may include a fleet of one or more IRC servers, for example implemented as VMs on the regional network by the same service and technology that provides VM resources to customers of the provider network. The services 104 and APIs 103 may include a peering service and an inter-region peering API via which customers can request inter-region peerings for their private networks on the region, and via which customers can also accept requests for inter-region peerings for their private networks on the region. In some embodiments, the inter-region peering API may also allow customers to reject inter-region peering requests, and to delete existing inter-region peerings for their respective private networks.

In each regional network 102, the IRC 130 operates asynchronously to the control plane 122 to coordinate the establishment and management of peerings between private networks 110 in the respective regional network 102 and private networks 110 in other regional networks 102. By using the IRC to coordinate inter-region peerings, the control planes 122 of the regional networks 102 do not have to directly communicate and dependencies between the control planes 122 are not required.

In each regional network 102, to perform inter-region peering operations, the IRC 130 may implement a local-remote-local method or process in which an IRC server invokes an API to the control plane 122 of the local regional network 102 to get work (e.g., drive to completion (create peering, accept peering, delete peering), expire peering, or verify consistency work), invokes an API to the control plane 122 of a remote regional network 102 to notify the remote control plane 122 of the work to be done (e.g., create peering, accept peering, delete peering, etc.), and then invokes an API to the control plane 122 of the local regional network 102 to inform the control plane 122 that the work has been done.

Figure 2:
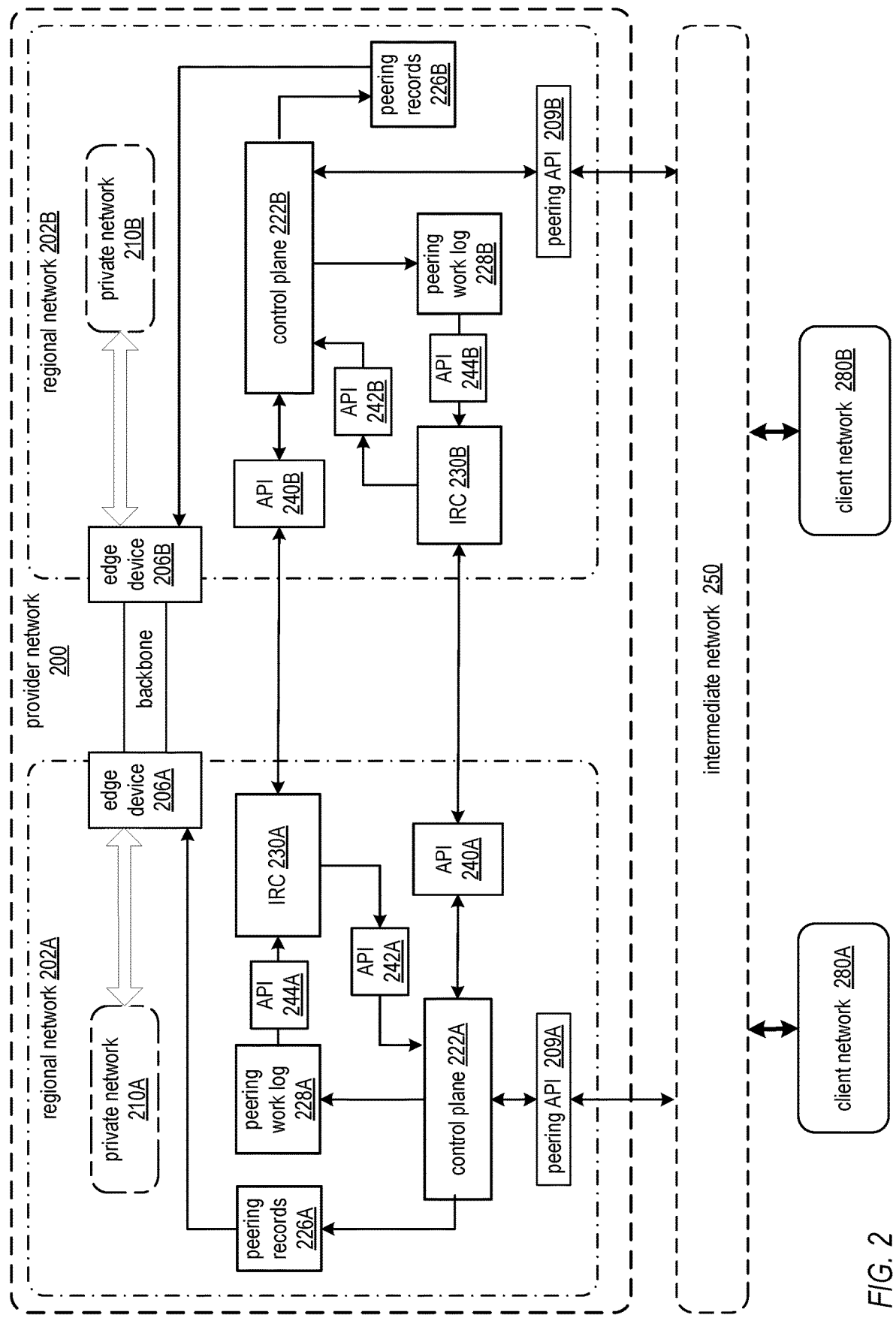
FIG. 2 illustrates components and operations that coordinate peerings between private networks in different regional networks of a provider network, according to some embodiments.

FIG. 2 illustrates components and operations that coordinate peerings between private networks in different regional networks of a provider network, according to some embodiments. FIG. 2 graphically illustrates operations of an inter-region coordinator (IRC) service in coordinating an inter-region peering between private networks 210A and 210B in different regional networks 202A and 202B of the provider network 200, respectively, according to some embodiments. Private network 210A may be owned or managed by a customer associated with client network 280A, and private network 210B may be owned or managed by a customer associated with client network 210B. Note that embodiments may support cross-customer inter-region peerings, in which case the customers are different customers who respectively own private networks 210A and 210B, and may also support same-customer inter-region peerings, in which case the customers are the same customer who owns both private networks 210A and 210B.

A customer may initiate an inter-region peering request, for example from a private network peering interface displayed on a console in client network 210A as illustrated in FIG. 14. The inter-region peering request is received from the customer according to the peering API 209A. The inter-region peering request specifies private network 210A on regional network 202A and private network 210B in regional network 210B to which the customer wants to establish a peering. The peering API 209A forwards the request to control plane 222A of regional network 202A. Control plane 222A creates an inter-region peering record in peering records 226A for the inter-region peering request, and generates an entry for the inter-region peering request (referred to as a create peering record) in an inter-region peering work log 228A for regional network 202A. In some embodiments, for security, the create peering record may be signed and encrypted.

IRC servers in the IRC 230A fleet on regional network 202A may periodically request work from the work log 228A via an API 244A. In some embodiments, the rate of inter-region API calls performed by the IRC servers within a regional network 202 may be controlled using a constant work method in which the IRC servers get inter-region peering work to be done at a constant rate (referred to as transactions per second, or TPS). A TPS may be set for the IRC service within a regional network, and the TPS for the regional network may be subdivided among the IRC servers in the fleet 230. Upon obtaining the create peering record the inter-region peering request, an IRC server on regional network 202A invokes an API 240B on regional network 202B as specified by the inter-region peering request to send the inter-region peering request to regional network 202B.

As previously noted, in some embodiments, the IRC servers may be implemented as VMs on regional network 202A by the same virtualization service and technology that provides VM resources and private networks 210 to customers of the provider network 200 to take advantage of the virtualized infrastructure provided by the virtualization service. However, the virtualized infrastructure provided by the virtualization service may be untrusted. Thus, to protect the IRC service from potential abuse (e.g., if the IRC service's account with the virtualization service is compromised), at least some of the inter-region peering data that passes through the IRC servers in fleet 230A may be signed and encrypted by the control plane 222A before being passed to the IRC servers. For example, work items retrieved from the inter-region peering work log 228A may be signed and encrypted before going to an IRC server, and may remain signed and encrypted when passed to regional network 202B via its API 240B. Thus, the inter-region peering information contained in the work items (e.g., information identifying and describing the local and remote private networks 210A and 210B that are to be peered) is not accessible, and is not accessed, by the IRC servers. Thus, in some embodiments, the IRC server on regional network 202A may only be made aware of the target regional network 202B to which the signed and encrypted payload is to be sent.

On regional network 202B, API 240B forwards the inter-region peering request to control plane 222B. Control plane 222B decrypts the inter-region peering request (if encrypted) and creates an inter-region peering record in peering records 226B for the inter-region peering request that indicates the peering request is pending acceptance. In some embodiments, the control plane process of the remote regional network may notify the customer that an inter-region peering between private network 210A and private network 210B has been requested, for example by displaying an indication of the inter-region peering request on a console on client network 280B according to the peering API 209B of regional network 202B as shown in FIG. 14. A response is sent from regional network 202B to the IRC server on regional network 202A indicating that the inter-region peering request is pending acceptance. The IRC server invokes an API 242A to notify the control plane 222A on regional network 202A that the inter-region peering request is pending acceptance on the regional network 202B, and marks the create peering record in the inter-region work log 228 as complete. Control plane 222A updates the inter-region peering record for the inter-region peering request in peering records 226A to indicate that it is pending acceptance. In some embodiments, the customer may then be informed by the peering API 209A that the inter-region peering request is pending acceptance on regional network 202B, for example by displaying an indication of the pending inter-region peering request on a console on client network 280A according to the peering API 209A as shown in FIG. 14.

After being informed by the peering API 209B that an inter-region peering between private networks 210A and 210B has been requested, for example by the inter-region peering request being displayed on the interface to the peering API 209B as shown in FIG. 14, the customer may accept or reject the inter-region peering request via the peering API, or may simply ignore the request. The following describes handling acceptance of the inter-region peering request. Note that, in some embodiments, rejecting an inter-region peering request may be handled in a similar fashion.

The customer may accept the inter-region peering request, for example from a private network peering interface displayed on a console in client network 210B as shown in FIG. 14. The accept request is received from the customer according to the peering API 209B of regional network 202B. In some embodiments, upon receiving the accept request from the customer B, the peering API 209B forwards the accept request to control plane 222B of regional network 202B. Control plane 222B updates the inter-region peering record for the inter-region peering request in peering records 226B to indicate that the peering is being provisioned, and generates an entry (referred to as an accept peering record) in an inter-region peering work log 228B for regional network 202B. In some embodiments, for security, the accept peering record may be signed and encrypted.

IRC servers in the IRC 230B fleet on regional network 202B may periodically request work from the work log 228B via an API 244B, for example according to a TPS for the IRC service on regional network 202B. Upon obtaining the accept peering record for the inter-region peering request, an IRC server on the regional network 202B invokes an API 240A on regional network 202A as specified by the inter-region peering request to notify regional network 202A that the inter-region peering between private networks 210A and 210B has been accepted. As previously noted, in some embodiments, the accept peering record may be signed and encrypted, and the IRC server on regional network 202B may only be made aware of the target regional network 202A to which the signed and encrypted payload is to be sent.

On regional network 202A, the API 240A forwards the accept peering message to control plane 222A, which updates the inter-region peering record for the inter-region peering request in peering records 228A to indicate that the peering is active, and provisions the inter-region peering in regional network 202A, for example by pushing information from peering records 226A for the inter-region peering to edge device 206A. A response is sent from regional network 202A to the IRC server on regional network 202B indicating that the inter-region peering is active on regional network 202A. On regional network 202B, the IRC server invokes an API 242B to notify the control plane 222B on regional network 202B that the inter-region peering is active on regional network 202A. Control plane 222B updates the inter-region peering record in peering records 226B to indicate that the inter-region peering is active and provisions the inter-region peering in regional network 202B, for example by pushing information from peering records 226B for the inter-region peering to edge device 206B. The control plane 222B may also mark the accept peering record in the inter-region work log 228B as complete.

In some embodiments, the local-remote-local method described above for requesting inter-region peerings (create peering operations) and accepting inter-region peerings (accept peering operations) may also be used for other inter-region peering operations handled by the IRC service, including but not limited to rejecting inter-region peering requests, deleting active inter-region peerings, handling expired peering requests (peering requests that have been waiting for acceptance for longer than a threshold amount of time), and verifying consistency of the inter-region peering records between regional networks. Create peering, accept peering, reject peering, and delete peering operations are customer-driven operations, and collectively may be referred to as "drive to completion" operations. Thus, the IRC service may be viewed as performing three types of work: drive to completion operations, expired peering operations, and verify consistency operations.

Figure 3A:
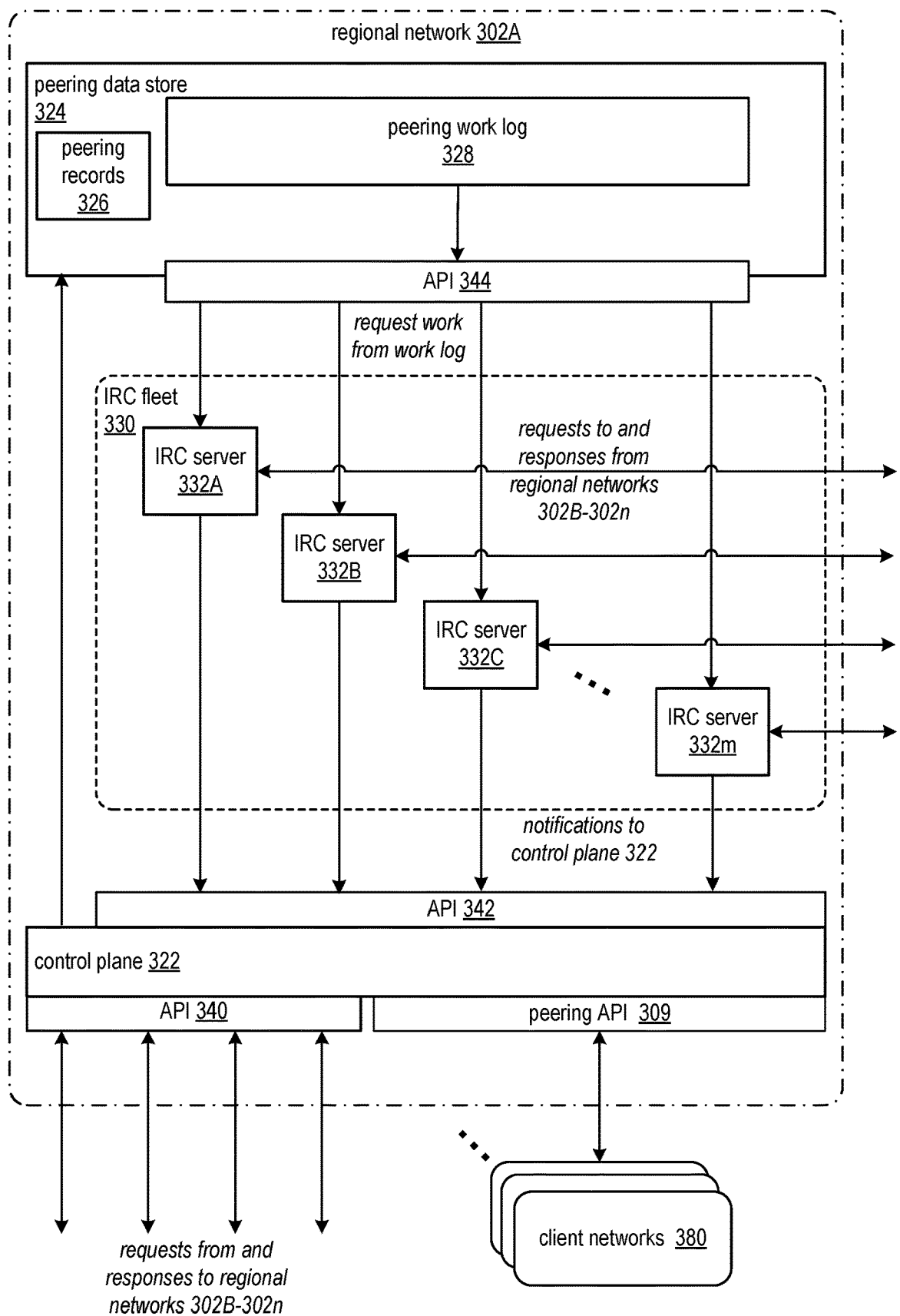
FIGS. 3A and 3B illustrate components and operations of an IRC service in a regional network of a provider network, according to some embodiments.
Figure 3B:
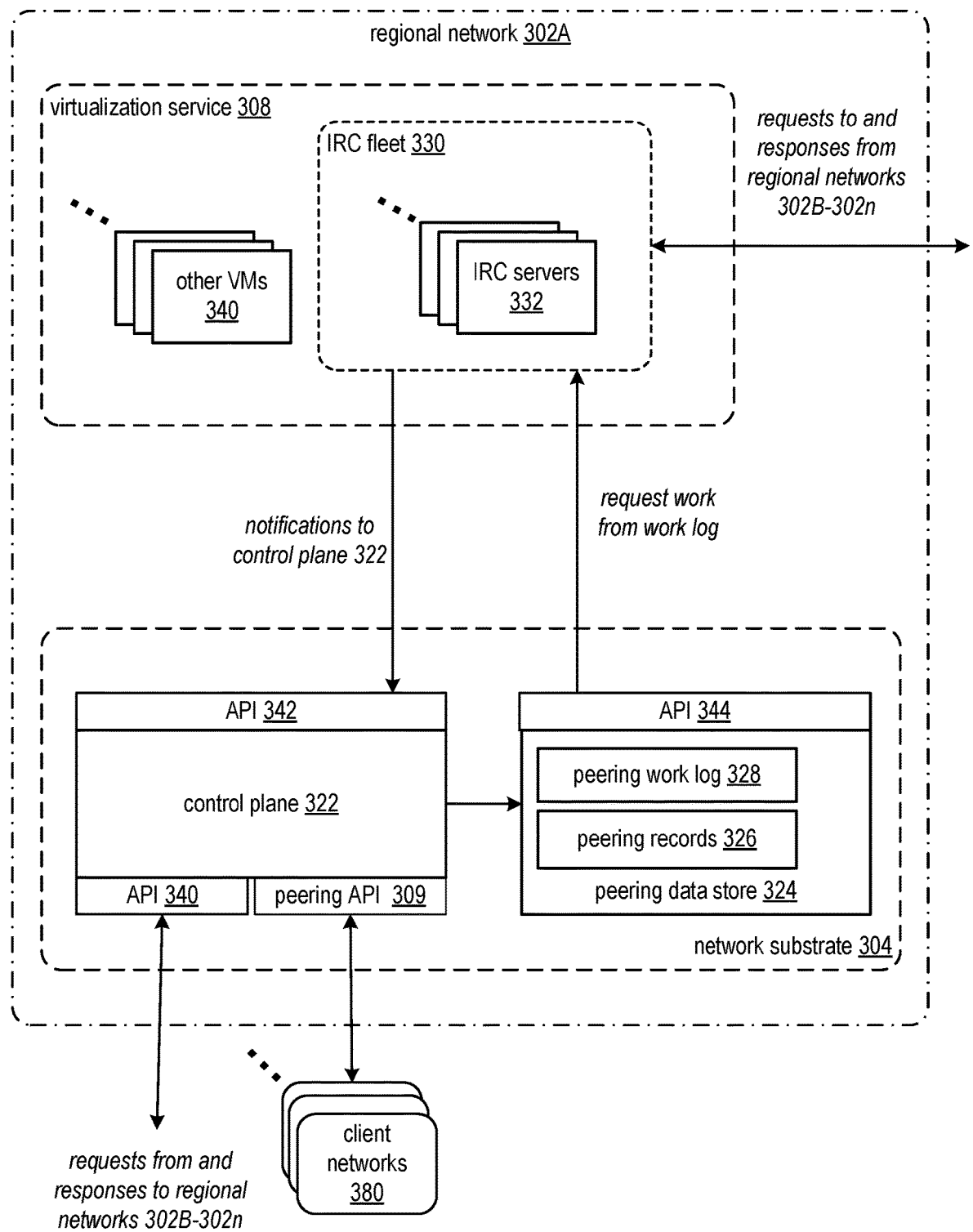

FIGS. 3A and 3B illustrate components and operations of an IRC service in a regional network of a provider network, according to some embodiments. As shown in FIG. 3A, regional network 302A may include a control plane 322, a peering data store 324, and an IRC service implemented by a fleet 330 of IRC servers 332A-332m. Servers 332A-332m may, for example, execute as virtual machines (VMs) on host devices of the regional network 302A using the same service and technology that provides VM resources to customers of the provider network. Implementing the IRC servers 332 as VMs using the service may, for example, allow the IRC fleet 330 to be quickly and easily expanded or contracted depending on factors such as work load and the number of regional networks 302 in the provider network without requiring the addition of hardware (e.g., physical servers). Further, if a server 332 instance goes down, is taken out of service for some reason, or is having problems, the server 332 instance can be quickly replaced by spinning up another server 332 instance.

The regional network 302A may provide an inter-region peering API 309 via which customers, for example from consoles in client networks 380, can request inter-region peerings for their private networks in regional network 302A, and via which customers can also accept requests for inter-region peerings for their private networks in regional network 302A. In some embodiments, the inter-region peering API 309 may also allow customers to reject inter-region peering requests for their respective private networks on regional network 302A, and to delete existing inter-region peerings for their respective private networks on regional network 302A.

The regional network 302A may provide an API 340 to control plane 322 that receives inter-region peering requests from other regional networks 302B-302n (for example, create peering and accept peering requests) and forwards the requests to control plane 322. The regional network 302A may also provide an API 342 to IRC fleet 330 that receives notifications from IRC servers 332A-332m and forwards the notifications to control plane 322.

In some embodiments, peering data store 324 may be implemented by one or more storage and/or database services of the provider network, and may include a data store or database of peering records 326 and a peering work log 328. The control plane 322 may create and update inter-region peering records in peering records 326, for example in response to inter-region peering requests from other regional networks 302B-302n received via API 340 or notifications from IRC servers 332A-332m received via API 342. In some embodiments, each inter-region peering record may be given a unique inter-region peering identifier. In some embodiments, each inter-region peering record may include one or more of, but is not limited to:
  an identifier of the private network on the local regional network;
  an identifier of the customer who owns the private network on the local regional network;
  an identifier of the remote regional network;
  an identifier of the private network on the remote regional network; and
  an identifier of the customer who owns the private network on the remote regional network (may be the same or a different customer than the customer who owns the private network on the local regional network).

The control plane 322 may generate inter-region peering work entries in the peering work log 328, for example in response to customers' inter-region peering requests received via peering API 309 or in response to inter-region peering requests from other regional networks 302B-302n received via API 340. In some embodiments, each inter-region peering record may include one or more of, but is not limited to:

- an operation (e.g., a create peering operation, accept peering operation, delete peering operation, reject peering operation, or a verify consistency operation.)
- a state (e.g., register intent, remote complete, final complete; see FIGS. 6A and 6B.)
- an identifier of the remote regional network that is the target of the operation.

The regional network 302A may provide an API 344 to peering work log 328 via which IRC servers 332A-332m may request inter-region peering work. Upon obtaining inter-region peering work for another regional network 302 from work log 328, for example a create peering or accept peering request for regional network 302B, an IRC server 332 invokes API 340 on the other regional network 302 (e.g., regional network 302B) to inform the control plane 322 on the other regional network 322 of the work that needs to be performed (e.g., create peering or accept peering), receives a response from the API 340 on the other regional network 302, and then notifies the control plane 322 of regional network 322A of the response via API 342. In some embodiments, the control plane 322 of regional network 322A may then mark the respective entry in the work log 328 as complete so that other IRC servers 322 do not attempt to perform the work.

FIG. 3B illustrates that, in some embodiments, the control plane 322 and peering data store 324 shown in FIG. 3A may logically be components of and execute in the network substrate 304 of regional network 302A, while the IRC servers 332 in the IRC fleet 330 execute as VMs in the virtualization service 308 environment on the regional network 302A that provides VMs 340 and virtualized private networks to customers of the provider network.

FIG. 4 illustrates a fleet of inter-region coordinator (IRC) servers implemented as virtual machines distributed across zones in a regional network of a provider network, according to some embodiments. In some embodiments, a regional network (regional network 402A, in this example) may include multiple availability zones 404, for example availability zones 404A, 404B, and 404C as shown in FIG. 4. Each availability zone 404 may be implemented by one or more data centers within the respective regional network 402A; a data center may implement one or more availability zones 404. The availability zones 404A-404C in regional network 402A may be connected through low-latency links (e.g., dedicated high-bandwidth fiber-optic links) and collectively form the regional network 402A. Communications between endpoints (e.g., customers' virtual resources) in different availability zones 404 within region 402A may go over an intermediate network such as the Internet or over the low-latency links. In some embodiments, provider network services may provide replication of a customer's virtual resources (e.g., VMs) across the availability zones 404A-404C of regional network 402A. By replicating a customer's virtual resources across the availability zones 404A-404C, the customer's virtual resources may remain available in another availability zone 404 in the regional network 402A if one availability zone 404 goes down for some reason. As shown in FIG. 4, in some embodiments, the fleet 430 of IRC servers 432 may be distributed across the availability zones 404A-404C in the regional network 402A. In some embodiments, the IRC servers 432 may be implemented as VMs in the availability zones 404A-404C using a provider network service that provisions VMs for customers on host devices in the availability zones 404A-404C and that provides replication of a customer's VMs across the availability zones 404A-404C.

Figure 5:
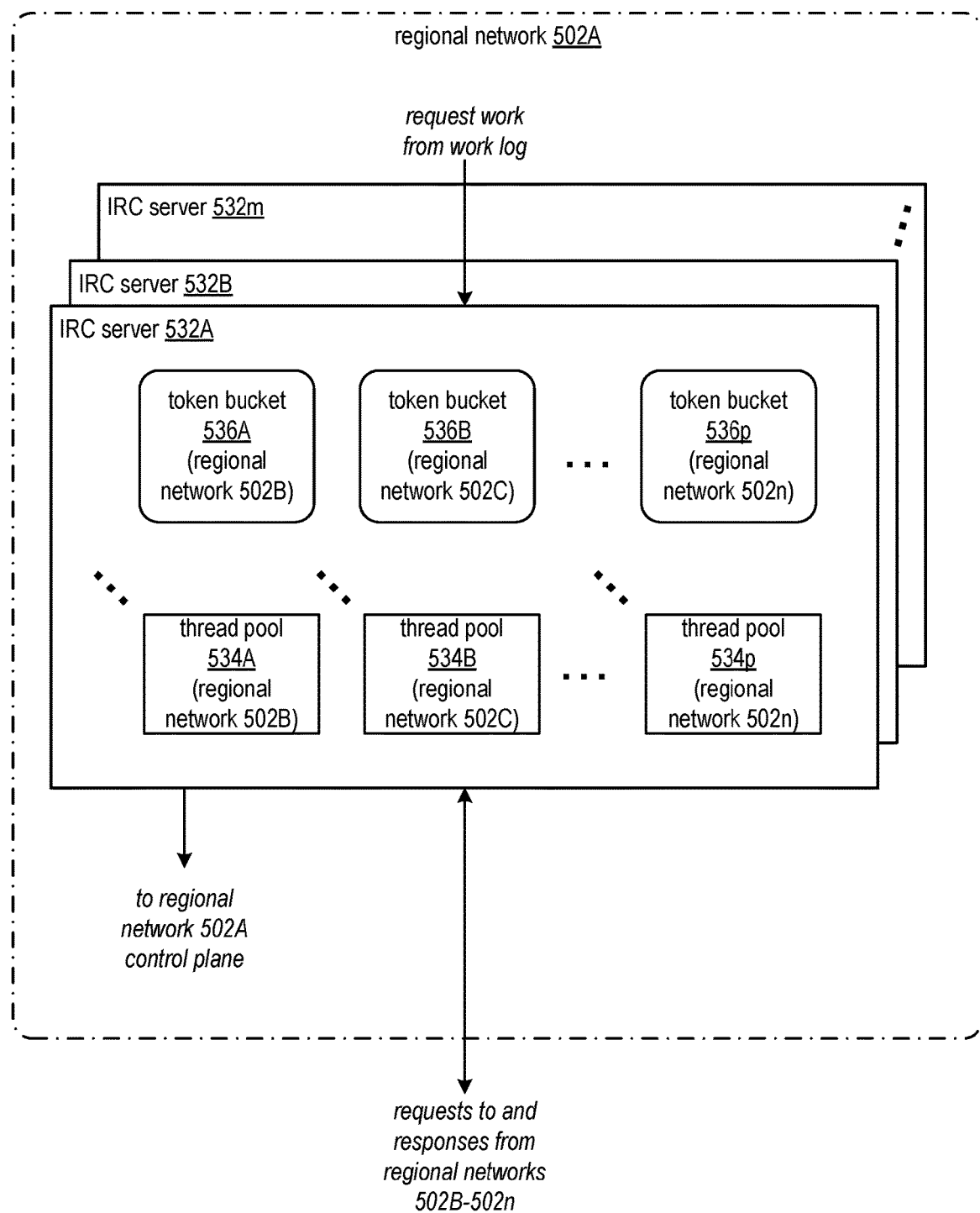
FIG. 5 illustrates components of an IRC server, according to some embodiments.

FIG. 5 illustrates components of an IRC server, according to some embodiments. As mentioned above, in some embodiments, the IRC service in a given regional network (regional network 502A, in this example) may include a fleet of IRC servers 532A-532m, for example implemented as VMs on the regional network 502A by the same service and technology that provides VMs as resources to customers of the provider network. As shown in FIG. 5, each IRC server 532A in regional network 502A's IRC fleet may include separate thread pools 534A-534p that perform inter-region peering operations for each other regional network 502B-502p that regional network 502A coordinates with; having a separate thread pool 534 on each IRC server 532 for each other regional network 502 may help prevent problems in one remote regional network 502 from impacting inter-region coordination with other remote regional networks 502. Thus, in some embodiments, there may be n−1 thread pools in each IRC server 532 in each regional network 502, where n is the total number of regional networks 502.

As shown in FIG. 5, each IRC server 532A in regional network 502A's IRC fleet may include separate thread pools token buckets 536A-536m corresponding to thread pools 534A-534p. In some embodiments, the rate of inter-region API calls performed by the IRC servers 532A-532m within a regional network 502A may be controlled using a constant work process via which the IRC servers 532A-532m get inter-region peering work to be done at a constant rate (referred to as transactions per second, or TPS), for example. In some embodiments, a TPS may be set for the IRC service within a regional network 502A, and the TPS for the regional network 502A may be subdivided among the IRC servers 532A-532m. For example, given a TPS T for a regional network 502A, and given that there are m IRC servers 532 in the regional network 502A, then the TPS for each IRC server 532 may be T/m. In some embodiments, the IRC service may use tokens to throttle the TPS for each IRC server 532; tokens may be distributed among the IRC servers 532 in the fleet according to the TPS T for a regional network 502A, with each IRC server 532 receiving T/m tokens. In some embodiments, there may be one token bucket 536 for each thread pool 534 on an IRC server 532A. Thus, in some embodiments, there may be n−1 token buckets 536 in each IRC server 532 in each regional network 502, where n is the total number of regional networks 502.

In some embodiments, the constant rate of work may be filled with configurable weighted proportions of three types of work (drive to completion, expired peerings, and verify consistency). When an IRC server 532A is ready to do work according to its TPS, it must first get inter-region work to do. To get work the IRC server 532A calls an API to the regional network 502A's inter-region work log and specifies the type of work it wants to retrieve. In some embodiments, the IRC server 532A randomly selects the type of work to be performed based on configurable weighted proportions. This random selection of work may converge on the configured percentages over time. This method may, for example, prevent drive to completion operations from starving expired peering operations. In some embodiments, if an IRC server 532A randomly selects to perform a drive to completion operation or an expired peering operation, but there is no drive to completion or expired peering work to be done, the IRC server 532A may instead perform a verify consistency operation. This may help to maintain a constant rate of inter-region peering API calls.

Figure 6A:
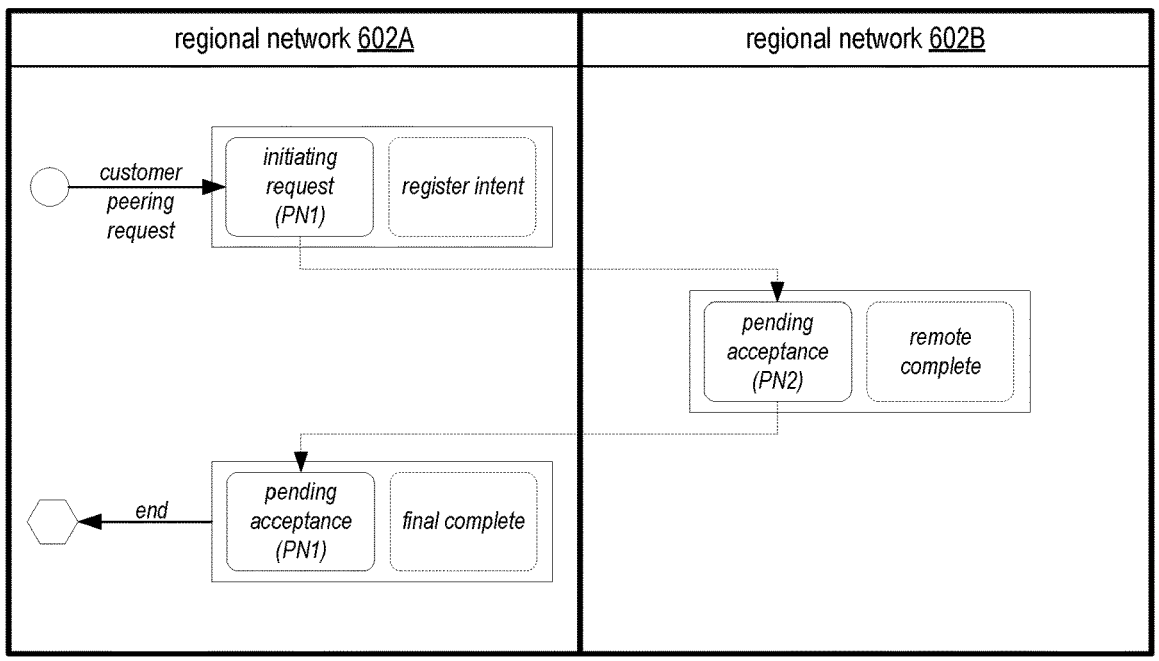
FIGS. 6A and 6B illustrate distributed state changes during local-remote-local operations for create peering and accept peering operations, according to some embodiments.
Figure 6B:
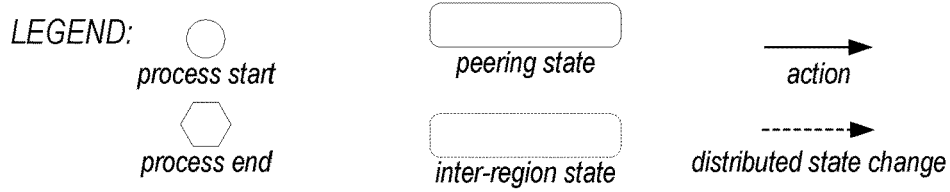
Figure 6B:
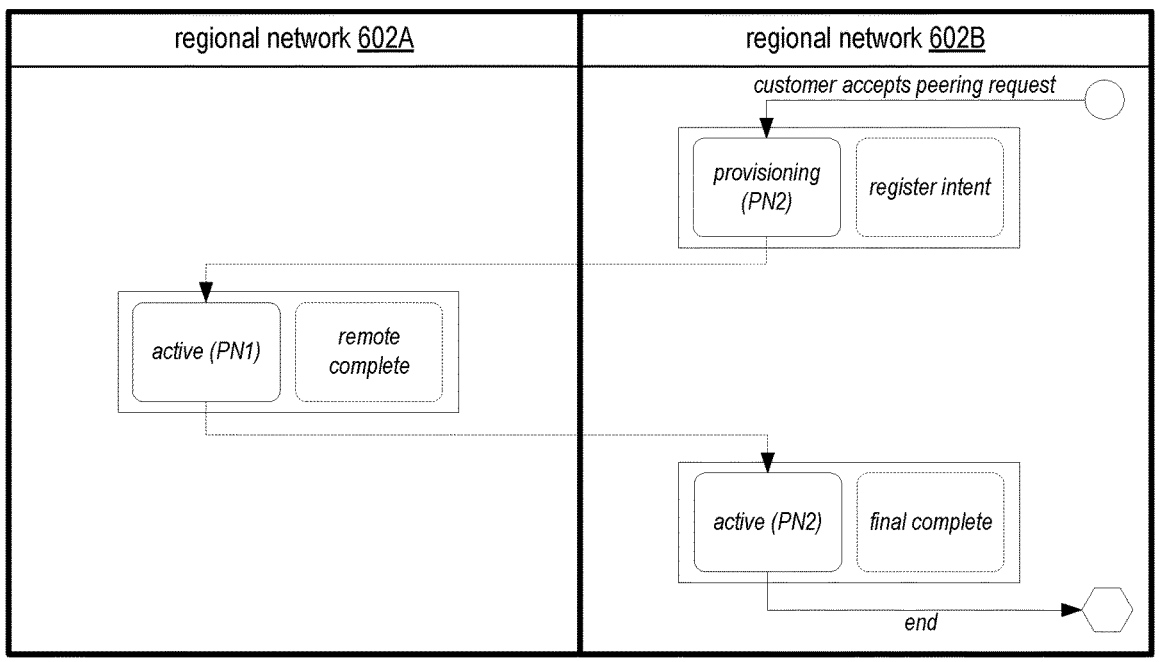

FIGS. 6A and 6B illustrate distributed state changes during local-remote-local operations for create peering and accept peering operations, according to some embodiments. FIG. 6A illustrates distributed state changes when performing a create peering operation. FIG. 6B illustrates distributed state changes when performing an accept peering operation. Note that embodiments may support cross-customer inter-region peerings, in which case one customer owns the private network in regional network 602A that is being peered to a private network in regional network 602B that is owned by a different customer, and may also support same-customer inter-region peerings, in which case the same customer owns both the private network in regional network 602A and the private network in regional network 602B that are being peered.

In FIG. 6A, a customer generates an inter-region peering request on regional network 602A specifying a local private network PN1 on regional network 602A and a remote private network PN2 on regional network 602B, for example via a peering API. The peering state in regional network 602A is initiating request (PN1), and the inter-region state is register intent. The IRC on regional network 602A performs a create peering operation to regional network 602B; the peering state in regional network 602B is pending acceptance (PN2), and the inter-region state is remote complete. The IRC on regional network 602A receives a response to the create peering operation from regional network 602B; the peering state in regional network 602A becomes pending acceptance (PN1), and the inter-region state is final complete.

In FIG. 6B, a customer generates an accept peering request on regional network 602B for the inter-region peering request for private network PN1 on regional network 602A and private network PN2 on regional network 602B, for example via a peering API. The peering state in regional network 602B becomes provisioning (PN2), and the inter-region state is register intent. The IRC on regional network 602B performs an accept peering operation to regional network 602A; the peering state in regional network 602A becomes active (PN1), and the inter-region state is remote complete. The IRC on regional network 602B receives a response to the accept peering operation from regional network 602A; the peering state in regional network 602B becomes active (PN2), and the inter-region state is final complete.

Figure 7A:
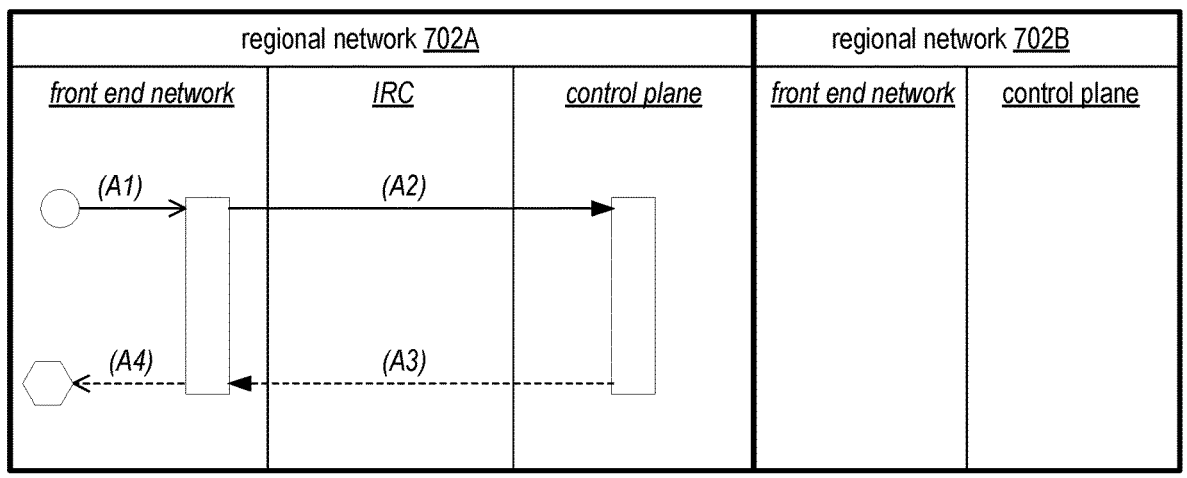
FIGS. 7A and 7B illustrate a sequence of operations performed in response to initiating an inter-region peering request for a peering between two private networks in different regional networks, according to some embodiments.
Figure 7B:
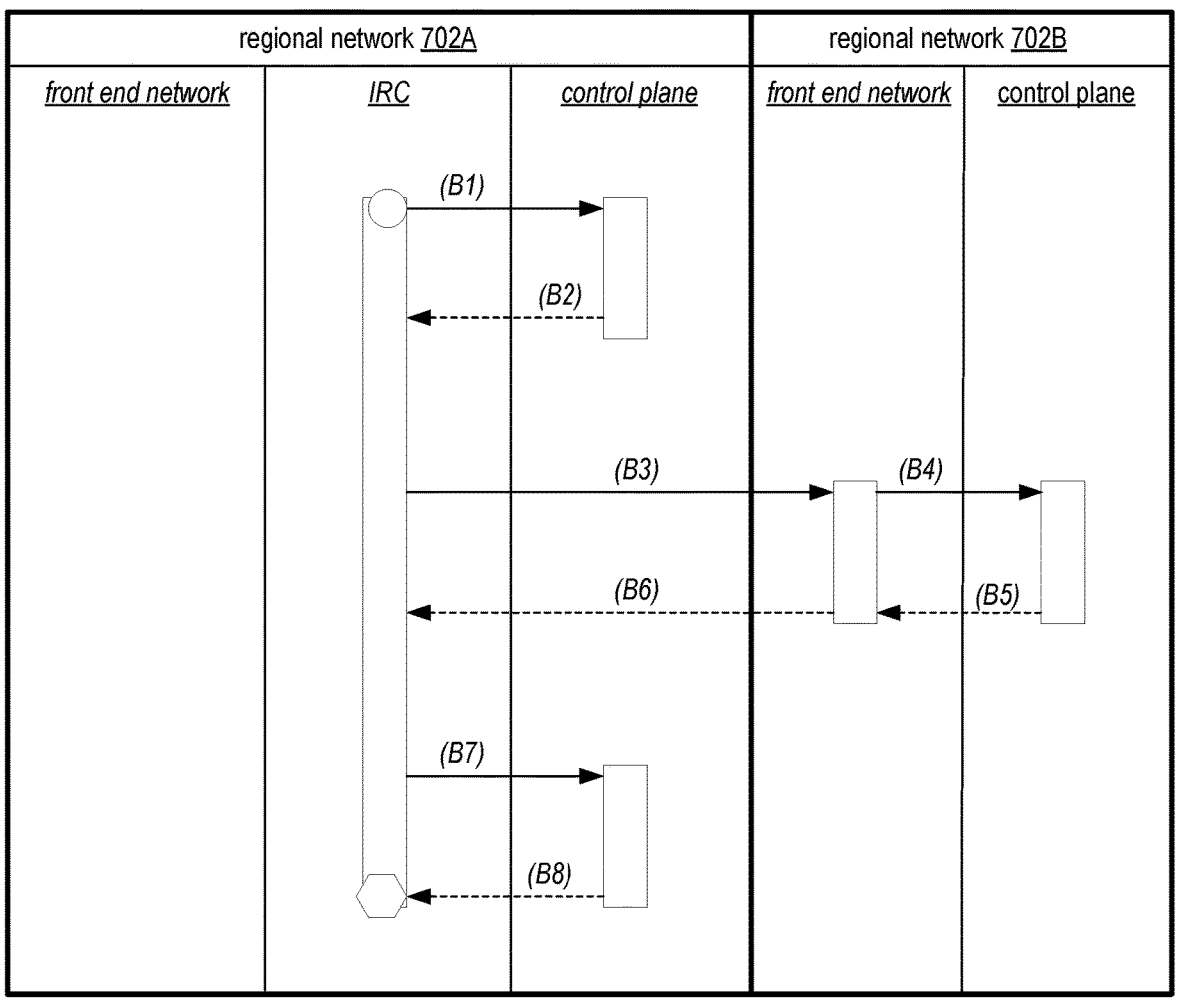

FIGS. 7A and 7B illustrate a sequence of operations performed in response to initiating an inter-region peering request for a peering between two private networks in different regional networks 702A and 702B, according to some embodiments. FIG. 7A illustrates receiving an inter-region peering request from a customer on regional network 702A. At A1, an inter-region peering request is received from the customer, for example via a peering API of the regional network 702A. At A2, the inter-region peering request is passed to the control plane of regional network 702A. The control plane creates an inter-region peering record for the inter-region peering request and generates a create peering work item in a work log for the inter-region peering request. At A3 and A4, the operation completes. In some embodiments, the customer may be informed that the inter-region peering request is pending acceptance via the peering API.

FIG. 7B illustrates performing a create peering operation using a local-remote-local method. FIG. 7B is performed asynchronously to the operations of FIG. 7A. At B1, the IRC of regional network 702A is ready to perform inter-region peering work, for example according to a TPS specified for the IRC on regional network 702A, and invokes an API of the regional network 702A control plane to get a work item. At B2, the create peering work item for the inter-region peering request is returned to the IRC. At B3, the IRC of regional network 702A invokes an API on regional network 702B to send the create peering work item to the regional network 702B. At B4, the create peering work item is forwarded to the control plane of regional network 702B. The control plane of regional network 702B creates an inter-region peering record for the inter-region peering request and records the inter-region peering request as pending acceptance. At B5 and B6, a response is returned to the IRC on regional network 702A. At B7, the IRC on regional network 702A invokes an API of the regional network 702A control plane to provide the response to the control plane. The control plane records the inter-region peering request as pending acceptance, and marks the create peering work item as complete. At B8 the local-remote-local operation completes.

Figure 8A:
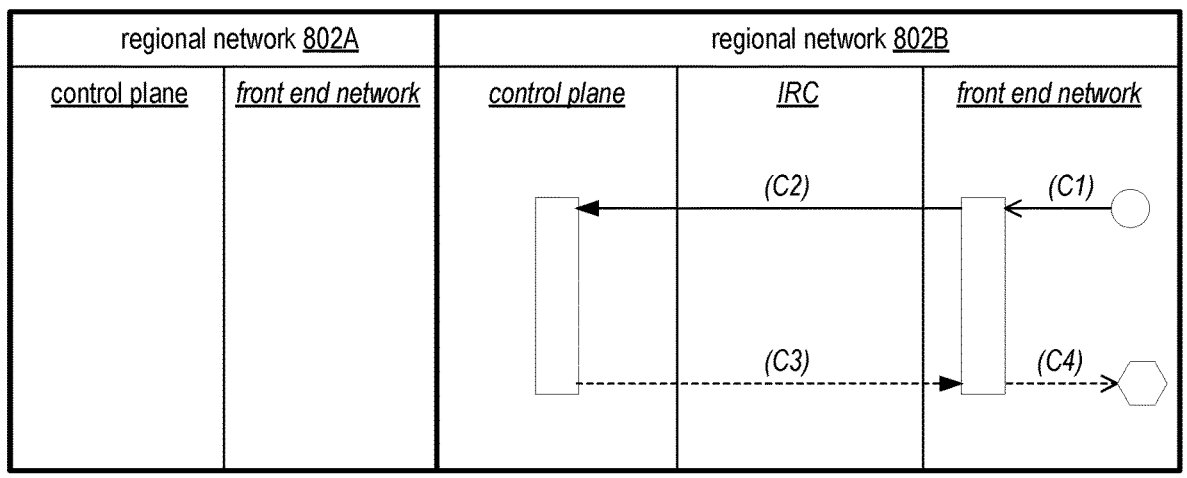
FIGS. 8A and 8B illustrate a sequence of operations performed in response to accepting an inter-region peering request for a peering between two private networks in different regional networks, according to some embodiments.
Figure 8B:
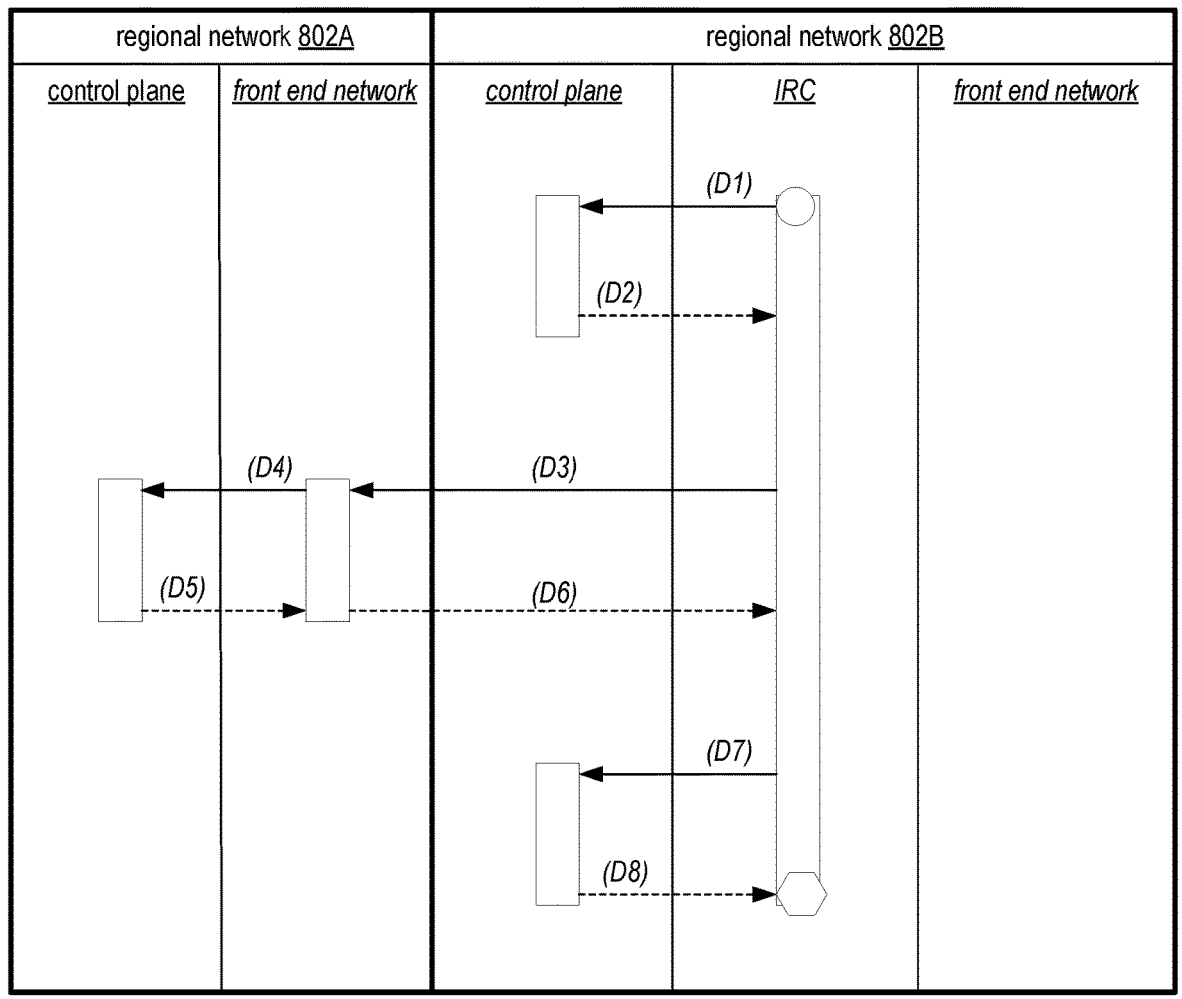

FIGS. 8A and 8B illustrate a sequence of operations performed in response to accepting an inter-region peering request for a peering between two private networks in different regional networks, according to some embodiments. FIG. 8A illustrates receiving an accept peering request from a customer on regional network 802B. As previously described, embodiments may support cross-customer inter-region peerings, and may also support same-customer inter-region peerings. Thus, the customer may be the same customer that made the inter-region peering request as illustrated in FIG. 7A, or may be a different customer. At C1, an accept peering request is received from the customer, for example via a peering API of the regional network 802B. At C2, the accept peering request is passed to the control plane of regional network 802B. The control plane updates the inter-region peering record for the inter-region peering request to indicate that the inter-region peering is provisioning and generates an accept peering work item in a work log. At C3 and C4, the operation completes. In some embodiments, the customer may be informed that the inter-region peering request is being provisioned via the peering API.

FIG. 8B illustrates performing an accept peering operation using a local-remote-local method. FIG. 8B is performed asynchronously to the operations of FIG. 8A. At D1, the IRC of regional network 802B is ready to perform inter-region peering work, for example according to a TPS specified for the IRC on regional network 702B, and invokes an API of the regional network 802B control plane to get a work item. At D2, the accept peering work item for the inter-region peering request is returned to the IRC. At D3, the IRC of regional network 802B invokes an API on regional network 802A to send the accept peering work item to the regional network 802A. At D4, the accept peering work item is forwarded to the control plane of regional network 802A. The control plane of regional network 802A updates the inter-region peering record to indicate that the inter-region peering is active and provisions the inter-region peering in regional network 802A, for example by pushing information for the inter-region peering to regional network 802A's edge devices. At D5 and D6, a response is returned to the IRC on regional network 802B. At D7, the IRC on regional network 802B invokes an API of the regional network 802B control plane to provide the response to the control plane. The control plane updates the inter-region peering record to indicate that the inter-region peering is active and provisions the inter-region peering in regional network 802B, for example by pushing information for the inter-region peering to regional network 802B's edge devices. At D8, the local-remote-local operation completes.

Figure 9:
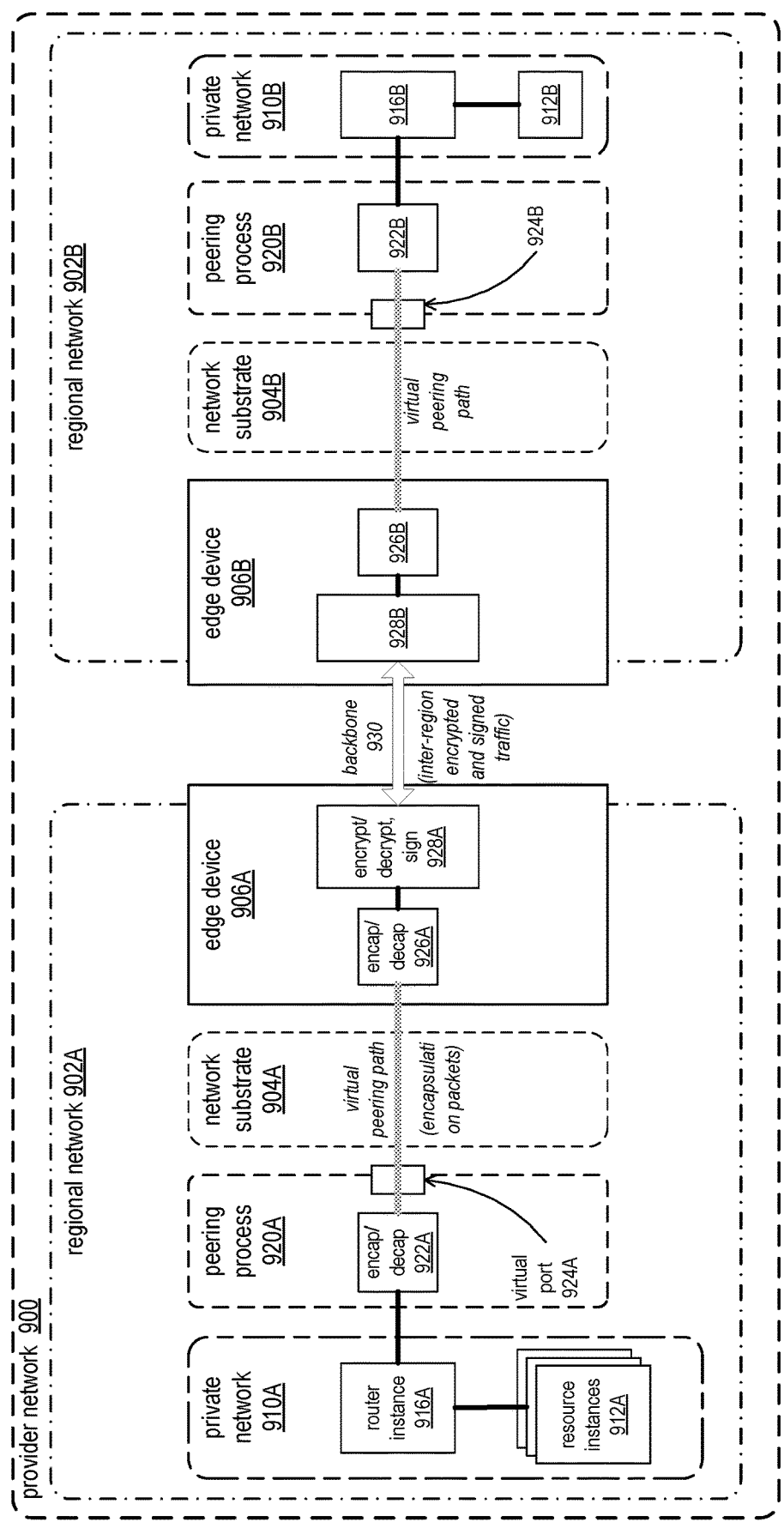
FIG. 9 illustrates data flow between two peered private networks in different regional networks of a provider network, according to some embodiments.

FIG. 9 illustrates an inter-region peering and data flow between two peered private networks 910A and 910B in different regional networks 902A and 902B of a provider network 900, according to some embodiments. Upon an inter-region peering request being accepted, a virtual inter-region peering may be provisioned on the two regional networks 902A and 902B. In some embodiments, provisioning an inter-region peering on the regional networks 902 may involve establishing or configuring a virtual peering process 920 for each virtual network 910 on their respective regional networks 902; the virtual peering process 920 may be viewed as a virtual analog to a physical transit center. A virtual peering process 920 may implement one or more virtual ports 924 that may be logically connected to virtual ports 924 on another other virtual peering process 920 to establish a peering connection to establish a peering connection; a peering connection may be viewed as a virtual analog to a physical cable connecting peered physical networks. A peering connection passes over the network substrate 904 in each regional network 902 to an edge device 906 of the respective regional network 902. In some embodiments, the virtual peering process 920 encapsulates outgoing IP packets according to a protocol used on the network substrate 904, and decapsulates incoming IP packets. The peering connection passes between the edge devices 906 of two regional networks 902 over a provider network 900 backbone 930 that connects the regional networks 902. By passing the peering connection over the backbone 930 between the regional networks' edge devices 906, the traffic on the peering connection between the two private networks 902 does not pass over a public network such as the Internet. However, in an alternative embodiment, the peering connection may instead pass through a secure connection (e.g., a virtual private network (VPN) connection) over an intermediate network such as the Internet. In some embodiments, the edge devices 906 decapsulate IP packets received from the peering process 920, and encapsulate the IP packets according to a protocol used on the backbone 930 between edge devices 906 in different regional networks 902 before sending the packets to another edge device 906. Packets received by an edge device 906 from another edge device 906 are decapsulated, and then encapsulated according to the protocol used on the network substrate 904 before sending the packets to the peering process 920. In some embodiments, for security, traffic on the peering connection between the two edge devices 906 may be signed and encrypted by the edge devices 906. Once a peering connection is established between two private networks 910 in different regional networks 902, routing tables used by router instances 916 executing as VMs in the private networks 910 may be configured with routes to the peering connection by the respective customers, and endpoints in the two private networks 910 may then begin communicating over the peering connection as if the two virtual private networks 910 were connected by a physical cable.

In some embodiments, a peering service and API may be provided that allow customers to configure and manage peering processes 920, virtual ports 924, IP address ranges, and route tables for inter-region peerings. In some embodiments, the customers may configure particular ports for inter-region peerings. For example, in addition to allowing a customer to define a route table for a virtual port 924, the customer may be allowed to specify a particular network protocol or protocols (e.g., TCP, UDP, ICMP, etc.) that will be used for the virtual peering, specify security protocols for the peering, specify bandwidth for the peering, and so on. Note at least some of the port configuration information may be determined via at an out-of-band negotiation between the respective customers associated with the private networks 910 that are to be peered, and may then be configured for the port(s) of the peering via the peering service and API.

Figure 10:
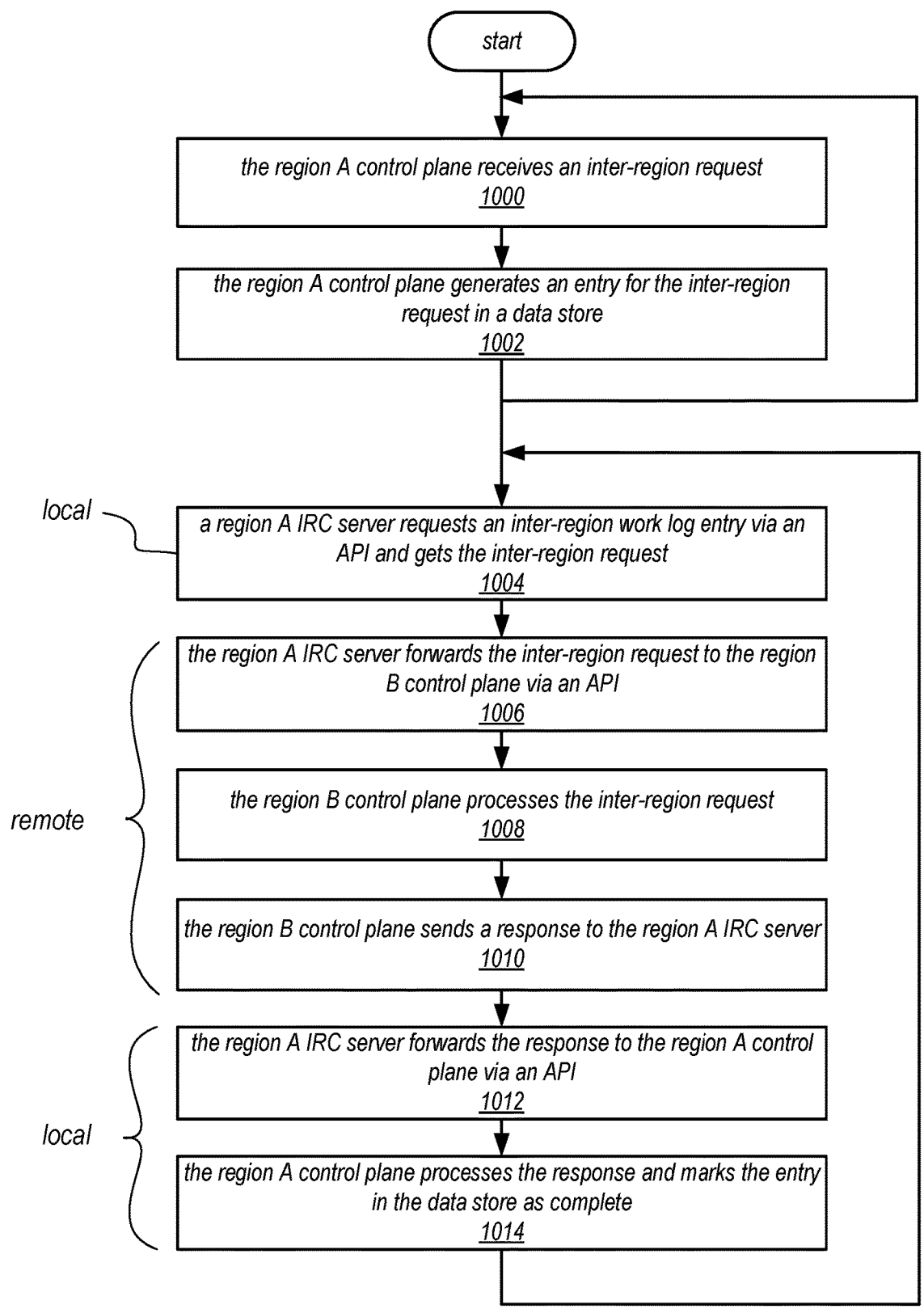
FIG. 10 is a flowchart of a method for performing local-remote-local operations between two regional networks of a provider network, according to some embodiments.

FIG. 10 is a flowchart of a method for performing local-remote-local operations between two regional networks of a provider network, according to some embodiments. The two regional networks may be referred to as region A and region B. As indicated at 1000, the region A control plane receives an inter-region request. As indicated at 1002, the region A control plane generates an entry for the inter-region request in a data store. for example in a database, an inter-region work log maintained by the control plane, or in some other storage location. The entry specifies an inter-region operation to be performed and also specifies region B as the target regional network for the inter-region operation. As indicated by the arrow returning from element 1002 to element 1000, the region A control plane may continue to receive inter-region requests and generate work log entries.

As indicated at 1004, a region A IRC server requests an inter-region work log entry via an API to the inter-region work log, and gets the inter-region request via the API (a local operation). At 1006 through 1010, the region A IRC server performs a remote operation to send the inter-region request to region B. As indicated at 1006, the region A IRC server forwards the inter-region request to the region B control plane via an API. As indicated at 1008, the region B control plane processes the inter-region request. As indicated at 1010, the region B control plane sends a response to the region A IRC server.

Figure 13:
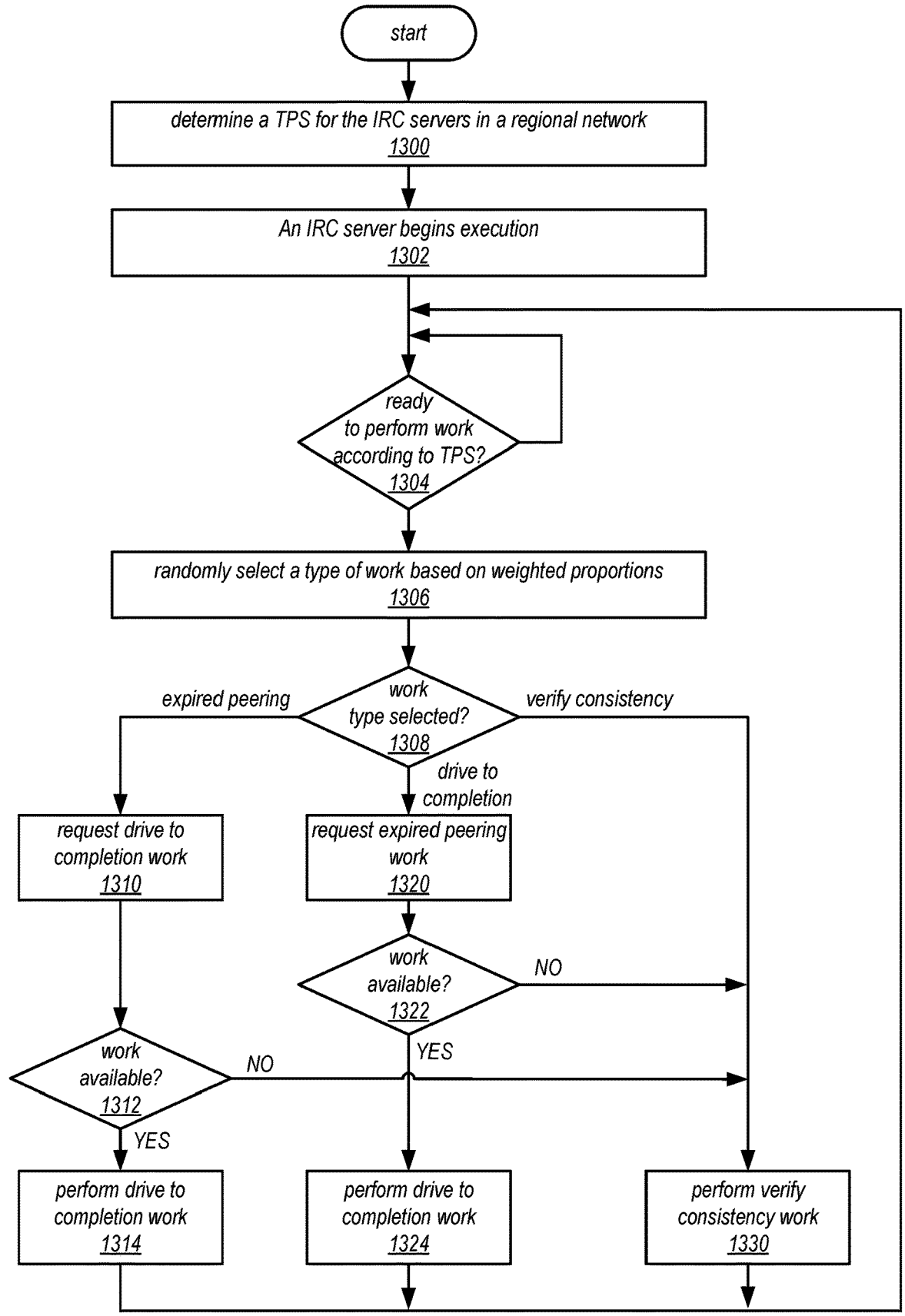
FIG. 13 is a flowchart of a method for performing IRC work at a constant rate, according to some embodiments.

At 1010 and 1012, the region A IRC server performs a local operation to complete the inter-region operation in region A. As indicated at 1012, the region A IRC server forwards the response to the region A control plane via an API. The region A control plane may process the response, and may perform one or more actions to complete the inter-region operation in region A. As indicated at 1014, the region A control plane marks the entry in the data store as complete. The arrow returning from element 1014 to element 1004 indicates that the IRC server may continue to request and process inter-region work log entries according to the local-remote-local method. In some embodiments, the IRC server may request and perform inter-region work according to a constant work method in which the IRC server performs inter-region work at a constant rate (referred to as transactions per second, or TPS), for example as illustrated in FIG. 13.

Elements 1004 through 1014 of FIG. 10 are performed asynchronously to elements 1000 and 1002 and are coordinated by a region A IRC server of the IRC service implementation in region A. As shown in FIG. 10, element 1004 is a local operation (i.e., local to region A) initiated by the region A IRC server via an API to the region A control plane, elements 1006-1010 are a remote operation initiated by the region A IRC server via an API to the region B control plane, and elements 1012 and 1014 are a local operation initiated by the region A IRC server via an API to the region A control plane. The IRC service implementation in region A thus operates asynchronously to the control plane of region A to coordinate inter-region operations between region A and other regions in the provider network (e.g., region B). By using the IRC service to asynchronously coordinate inter-region operations, the control planes of the regional networks do not have to directly communicate and dependencies between the control planes are not required.

Figure 11:
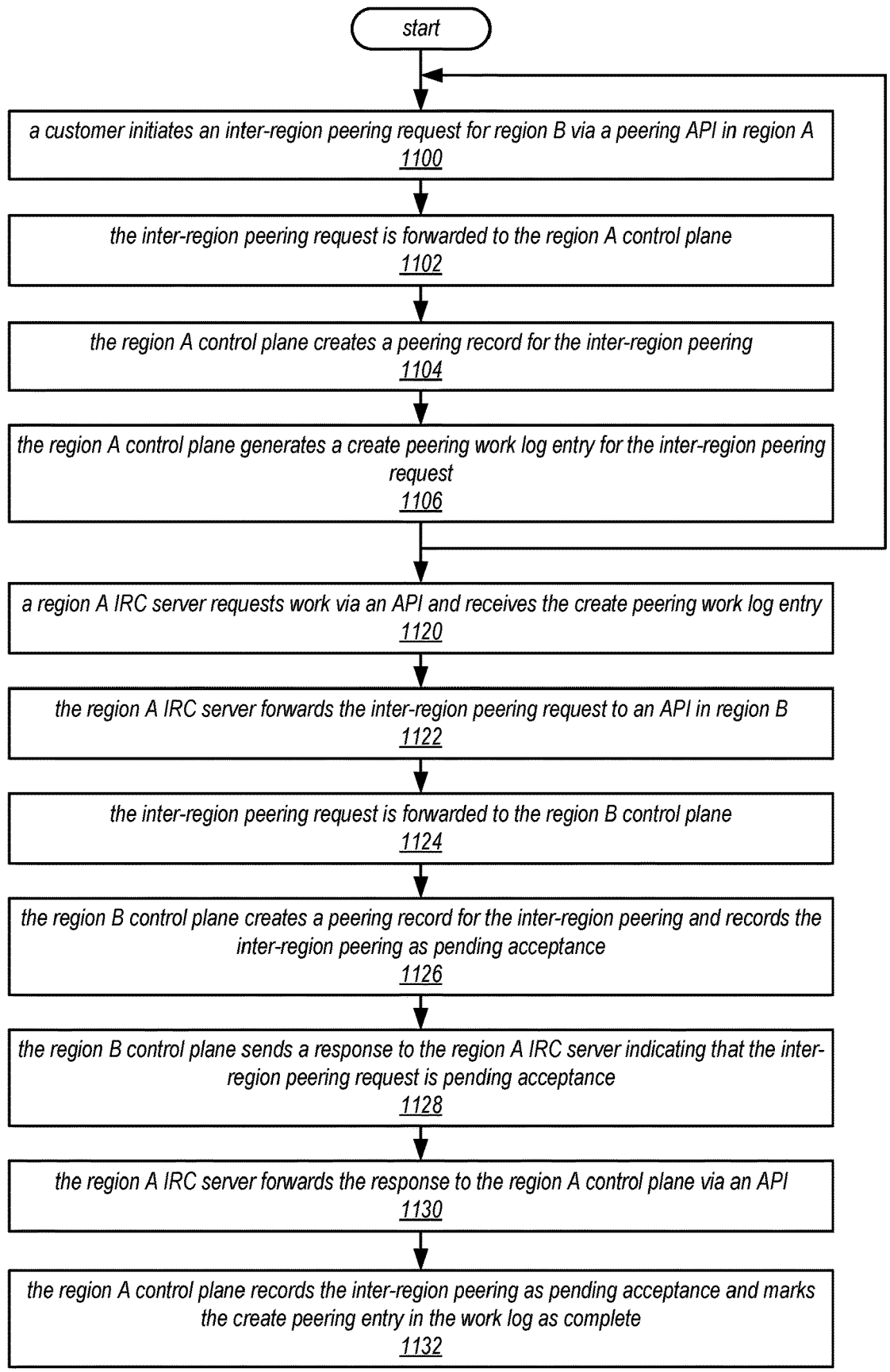
FIG. 11 is a flowchart of a method for initiating an inter-region peering request, according to some embodiments.
Figure 12:
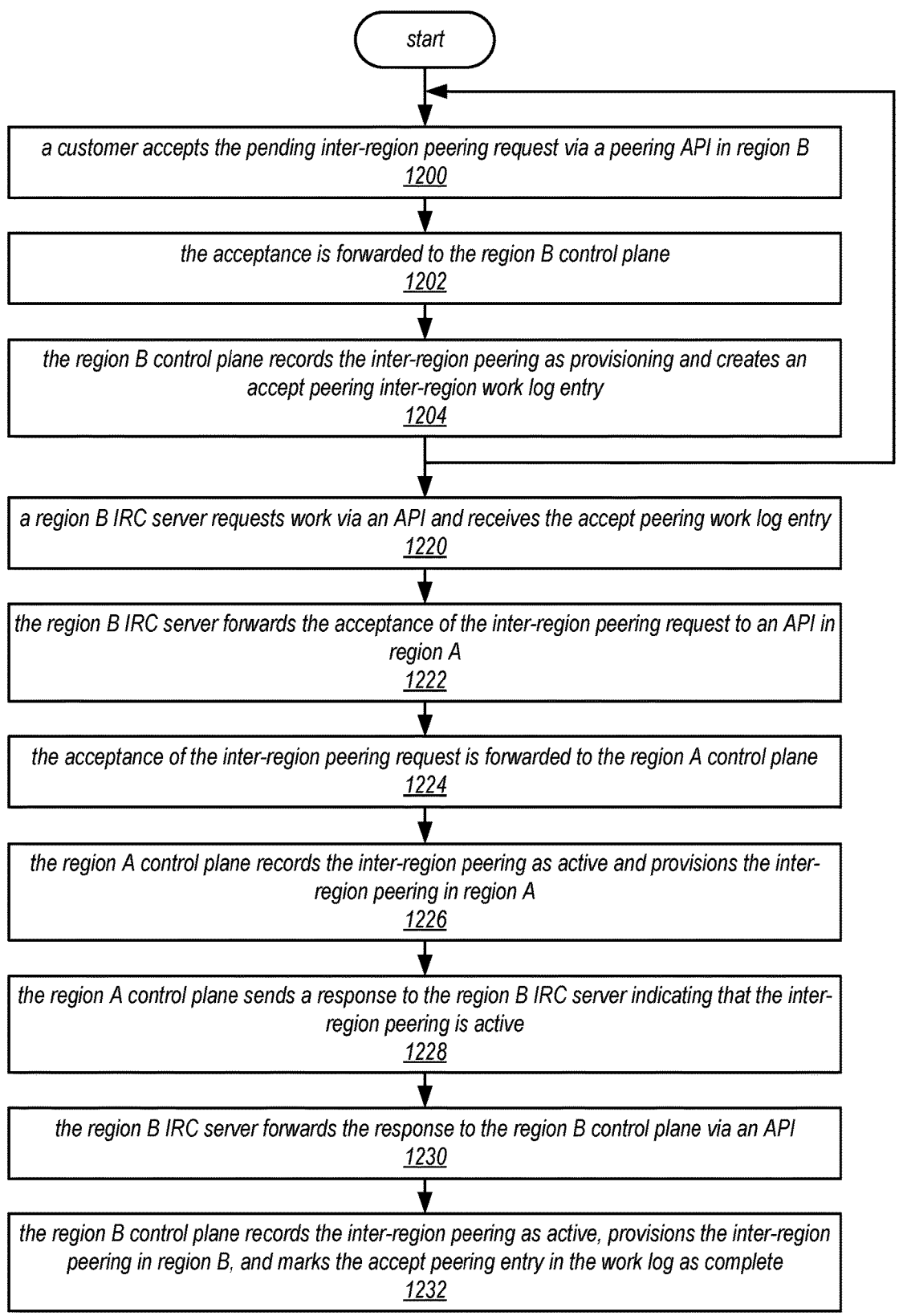
FIG. 12 is a flowchart of a method for accepting an inter-region peering request, according to some embodiments.

FIGS. 11 and 12 are flowcharts of methods for requesting and accepting inter-region peerings between private networks in two different regional networks of a provider network, according to some embodiments. In the methods, local-remote-local operations are performed between the two regional networks (designated as region A and region B, in this example) of a provider network by respective IRC service implementations in the two regional networks that operate asynchronously to the control planes of the regional networks. By using the IRC services to asynchronously coordinate inter-region operations, the control planes of the regional networks do not have to directly communicate and dependencies between the control planes are not required. Note that embodiments may support cross-customer inter-region peerings, in which case one customer owns the private network in region A, and a different customer owns the private network in region B, and may also support same-customer inter-region peerings, in which case the same customer owns both the private network in region A and the private network in region B.

FIG. 11 is a flowchart of a method for initiating an inter-region peering request, according to some embodiments. As indicated at 1100, a customer initiates an inter-region peering request for region B via a peering API in region A. The inter-region peering request, received from the customer according to the peering API, specifies a private network of the customer in region A, and also another private network in region B to which the customer wants to establish a peering. FIG. 14 illustrates an example inter-region peering interface to a peering API via which customers may submit inter-region peering requests. As indicated at 1102, the inter-region peering request is forwarded to the region A control plane. As indicated at 1104, the region A control plane creates an inter-region peering record for the inter-region peering. As indicated at 1106, the region A control plane generates a create peering inter-region work log entry for the inter-region peering request. As indicated by the arrow returning from 1106 to 1100, the region A control plane may continue to receive inter-region peering requests via the peering API (as well as other customer-initiated requests such as accept peering requests, reject peering requests, and delete peering requests) and to generate work log entries for the customer-initiated requests.

Elements 1120 through 1132 of FIG. 11 are performed asynchronously to elements 1100 through 1106 and are coordinated by a region A IRC server of the IRC service implementation in region A. As indicated at 1120, a region A IRC server requests work via an API to the region A inter-region work log and receives the create peering inter-region work log entry via the API. As indicated at 1122, the region A IRC server forwards the inter-region peering request to an API of the control plane in region B. As indicated at 1124, the inter-region peering request is forwarded to the region B control plane. As indicated at 1126, the region B control plane creates a peering record for the inter-region peering and records the inter-region peering as pending acceptance. As indicated at 1128, the region B control plane sends a response to the region A IRC server indicating that the inter-region peering request is pending acceptance. As indicated at 1130, the region A IRC server forwards the response to the region A control plane via an API. As indicated at 1132, the region A control plane records the inter-region peering as pending acceptance and marks the create peering entry in the region A inter-region work log as complete.

FIG. 12 is a flowchart of a method for accepting an inter-region peering request, according to some embodiments. As indicated at 1200, a customer accepts the pending inter-region peering request via a peering API in region B. FIG. 14 illustrates an example inter-region peering interface to a peering API via which customers may view and accept (or reject) pending inter-region peering requests. As indicated at 1202, the acceptance of the inter-region peering request is forwarded to the region B control plane. As indicated at 1204, the region B control plane records the inter-region peering as provisioning and creates an accept peering inter-region work log entry in the region B inter-region work log. As indicated by the arrow returning from 1204 to 1200, the region B control plane may continue to receive accept peering requests via the peering API (as well as other customer-initiated requests such as inter-region peering requests, reject peering requests, and delete peering requests) and to generate work log entries for the customer-initiated requests.

Elements 1220 through 1232 of FIG. 12 are performed asynchronously to elements 1200 through 1204 and are coordinated by a region B IRC server of the IRC service implementation in region B. As indicated at 1220, a region B IRC server requests work via an API to the region B inter-region work log and receives the accept peering inter-region work log entry via the API. As indicated at 1222, the region B IRC server forwards the acceptance of the inter-region peering request to an API of the control plane in region A. As indicated at 1224, the acceptance of the inter-region peering request is forwarded to the region A control plane. As indicated at 1226, the region A control plane records the inter-region peering as active and provisions the inter-region peering in region A. As indicated at 1228, the region A control plane process sends a response to the region B IRC server indicating that the inter-region peering is active. As indicated at 1230, the region B IRC server forwards the response to the region B control plane via an API. As indicated at 1232, the region B control plane process records the inter-region peering as active, provisions the inter-region peering in region B, and marks the accept peering entry in the region B work log as complete.

FIG. 13 is a flowchart of a method for performing IRC work at a constant rate, according to some embodiments. As indicated at 1300, a TPS for the IRC servers in a regional network is determined. As indicated at 1302, an IRC server begins execution on the regional network. At 1304, if the IRC server is ready to perform work according to the TPS, then as indicated at 1306 the IRC server randomly selects a type of work (e.g., drive to completion, expired peering, or verify consistency) based on weighted proportions. As a non-limiting example, the weighted proportions may cause the IRC server to attempt to perform drive to completion work 60 percent of the time, expired peering work 30 percent of the time, and verify consistency work 20 percent of the time. At 1304, if the IRC server is not ready to perform work according to the TPS, then the IRC server waits.

At 1308, if the work type selected is drive to completion work, then as indicated at 1310 the IRC server requests drive to completion work (e.g., create peering, accept peering, or delete peering) from the inter-region peering work log for the regional network. At 1312, if drive to completion work is available, then the IRC server performs the drive to completion work (e.g., create peering, accept peering, or delete peering) as indicated at 1314. Otherwise, if drive to completion work is not available, the IRC server performs verify consistency work as indicated at 1330.

At 1308, if the work type selected is expired peering, then as indicated at 1320 the IRC server requests expired work from the inter-region peering work log for the regional network. At 1322, if expired peering work is available, then the IRC server perform expired peering work as indicated at 1324. Otherwise, if expired peering work is not available, the IRC server performs verify consistency work as indicated at 1330.

At 1308, if the work type selected is verify consistency, then the IRC server performs verify consistency work as indicated at 1330. Performing verify consistency work when other types of work are not available assures that the IRC servers are performing inter-regional peering work at a constant rate.

FIG. 14 shows an example inter-region peering interface, according to some embodiments. A customer of a provider network 1400 may establish, provision, and manage private networks in regional networks 1402 of provider network 1400 via one or more services of the provider network 1400 accessed through a management console 1482 on client network 1480. The customer may access a peering API 1409 on a regional network 1402A via management console 1482 to request, accept, reject, and delete virtual peerings from the customer's private networks on regional network 1402 to other private networks in the other regions (regional networks 1402B and 1402C, in this example) of the provider network 1400.

In at least some embodiments, the peering API 1409 may display a peering interface 1484 on console 1482. The peering interface 1484 may provide one or more graphical and/or textual interface elements that allow the customer to create and manage virtual peerings from the customer's private networks in regional network 1402A to other private networks in the other regional networks 1402B and 1402C. To facilitate the establishment of inter-region peerings, the API 1409 may provide to the customer, via the interface elements of interface 1484, one or more of the following capabilities:

- Ability to request an inter-region peering between a local private network in regional network 1402A (PN 1, in this example) and a remote private network (PN 2 in region B (regional network 1402B), in this example).
- Ability to accept or reject inter-region peering requests for the customer's private networks in regional network 1402A that were submitted by other customers (or by this customer from another region). In this example, there is a pending inter-region peering request for a peering between private network PN 3 in region B and the customer's private network PN 1 in region A (regional network 1402A).
- Ability to view and delete existing inter-region peerings to the customer's private networks in regional network 1402A. In this example, there is an existing peering between PN 4 in region C (regional network 1402C) and the customer's private network PN 5 in region A (regional network 1402A)

The customer may, for example, use a cursor control device to select various interface elements provided by interface 1484 to, for example, submit inter-region peering requests, accept or reject inter-region peering requests, or delete existing inter-region peerings. The interface 1484 may include other user interface elements than those shown, for example menu or other elements that allow the customer to configure and manage virtual transit centers (shown as peering processes in FIG. 9), virtual ports, IP address ranges, and route tables for the inter-region peerings. In some embodiments, the peering API 1409 may, through interface 1484, provide one or more interface elements that allow the customer to configure particular ports for inter-region peerings. For example, in addition to allowing the customer to define a route table for a virtual port, the customer may be allowed to specify a particular network protocol or protocols (e.g., TCP, UDP, ICMP, etc.) that will be used for the virtual peering, specify security protocols for the peering, specify bandwidth for the peering, and so on. Note at least some of the port configuration information may be determined via at an out-of-band negotiation between the respective customers associated with the private networks that are to be peered, and may then be configured for the port(s) of the peering via the API 1409.

Verify Consistency Operations

As illustrated in FIG. 13, the IRC servers on a regional network may perform verify consistency operations to verify the consistency of the inter-region peering records between the regional network and other regional networks. In some embodiments, to perform a verify consistency operation, an IRC server on a first regional network may request verify consistency work via an API to the control plane. The control plane may keep track of peering records that have been verified, and may query the peering records store to obtain a next peering record that needs to be verified. The control plane may then return a checksum of the peering record and information identifying the inter-region peering corresponding to the peering record to the IRC server (e.g., information identifying the regional network and a second regional network, and information identifying the peered private networks). The IRC server may then perform a local-remote-local operation as illustrated in FIG. 10 in which the IRC server sends the verify peering information received from the control plane to the control plane of the second regional network via an API of the second regional network. The verify peering information may be encrypted before providing the information to the IRC server. The control plane of the second regional network verifies that a peering record on the second network corresponding to the received information is synchronized with the peering record on the first regional network, for example by comparing the received checksum to a checksum of the respective peering record on the second regional network, and sends a response to the IRC server on the first regional network. The IRC server forwards the response to the control plane of the first regional network. The response may indicate that the two peering records are synchronized, in which case no further action is necessary, or may indicate that the two peering records are not synchronized, in which case the response may include information that the control plane on the first regional network may use to update the peering record on the first regional network.

Reject Peering Operations

As previously mentioned, a customer may reject a pending inter-region peering request. In some embodiments, upon receiving a rejection of a pending inter-region peering request from a customer, the control plane and IRC service may perform a method similar to that described in reference to FIG. 12 for accepting an inter-region peering request. In some embodiments, to handle rejection of an inter-region peering request, the region B control plane records the inter-region peering as rejected in region B and creates a reject peering inter-region work log entry in the region B inter-region work log. A region B IRC server requests work via an API to the region B inter-region work log and receives the reject peering inter-region work log entry via the API. The region B IRC server forwards the rejection of the inter-region peering request to an API of the control plane in region A. The rejection of the inter-region peering request is forwarded to the region A control plane. The region A control plane records the inter-region peering as rejected and sends a response to the region B IRC server indicating that the inter-region peering is rejected. The region B IRC server forwards the response to the region B control plane via an API. The region B control plane marks the reject peering entry in the region B work log as complete.

Delete Peering Operations

As previously mentioned, a customer may delete an existing inter-region peering. In some embodiments, upon receiving a request to delete an existing inter-region peering from a customer, the control plane and IRC service may perform a method similar to that described in reference to FIG. 11 for creating an inter-region peering request. In some embodiments, to handle deletion of an inter-region peering, the region A control plane records the inter-region peering as deleted in region A and creates a delete peering inter-region work log entry in the region A inter-region work log. A region A IRC server requests work via an API to the region A inter-region work log and receives the delete peering A inter-region work log entry via the API. The region A IRC server forwards the deletion of the inter-region peering to an API of the control plane in region B. The deletion of the inter-region peering is forwarded to the region B control plane. The region B control plane records the inter-region peering as deleted and sends a response to the region A IRC server indicating that the inter-region peering is deleted in region B. The region A IRC server forwards the response to the region A control plane via an API. The region A control plane marks the delete peering entry in the region A work log as complete. Information indicating that the inter-region peering has been deleted may be pushed to the edge servers of the respective regional networks by the respective control planes.

Expired Peering Operations

As previously mentioned, the IRC servers on a regional network, may perform expired peering operations to expire inter-region peering requests that have been waiting for acceptance for longer than a threshold amount of time (e.g., one week). In some embodiments, a control plane process may monitor inter-region peering requests in the inter-region work log of the regional network to detect inter-region peering requests that that have been waiting for acceptance for longer than the threshold amount of time, and may generate expired peering work log entries for the detected expired peerings. In some embodiments, to perform an expired peering operation, an IRC server on a regional network may perform a local-remote-local operation, for example as illustrated in FIG. 10. The IRC server may request expired peering work via an API to the control plane. The control plane may return an expired peering work log entry. The IRC server may then forward the expired peering work log entry to the remote regional network via an API to the control plane of the remote regional network. The control plane of the remote regional network may record the inter-region peering request (previously in the pending acceptance state) as being expired, and return a response to the IRC server. The IRC server forwards the response to the control plane of the regional network via an API. The control plane of the regional network may also record the inter-region peering request (previously in the pending acceptance state) as being expired, and may mark the expired peering work log entry as complete. Note that expired inter-region peering requests cannot be accepted.

Example Provider Network Environment

This section describes example provider network environments in which embodiments of the methods and apparatus described in reference to FIGS. 1 through 14 may be implemented. However, these example provider network environments are not intended to be limiting.

Figure 15:
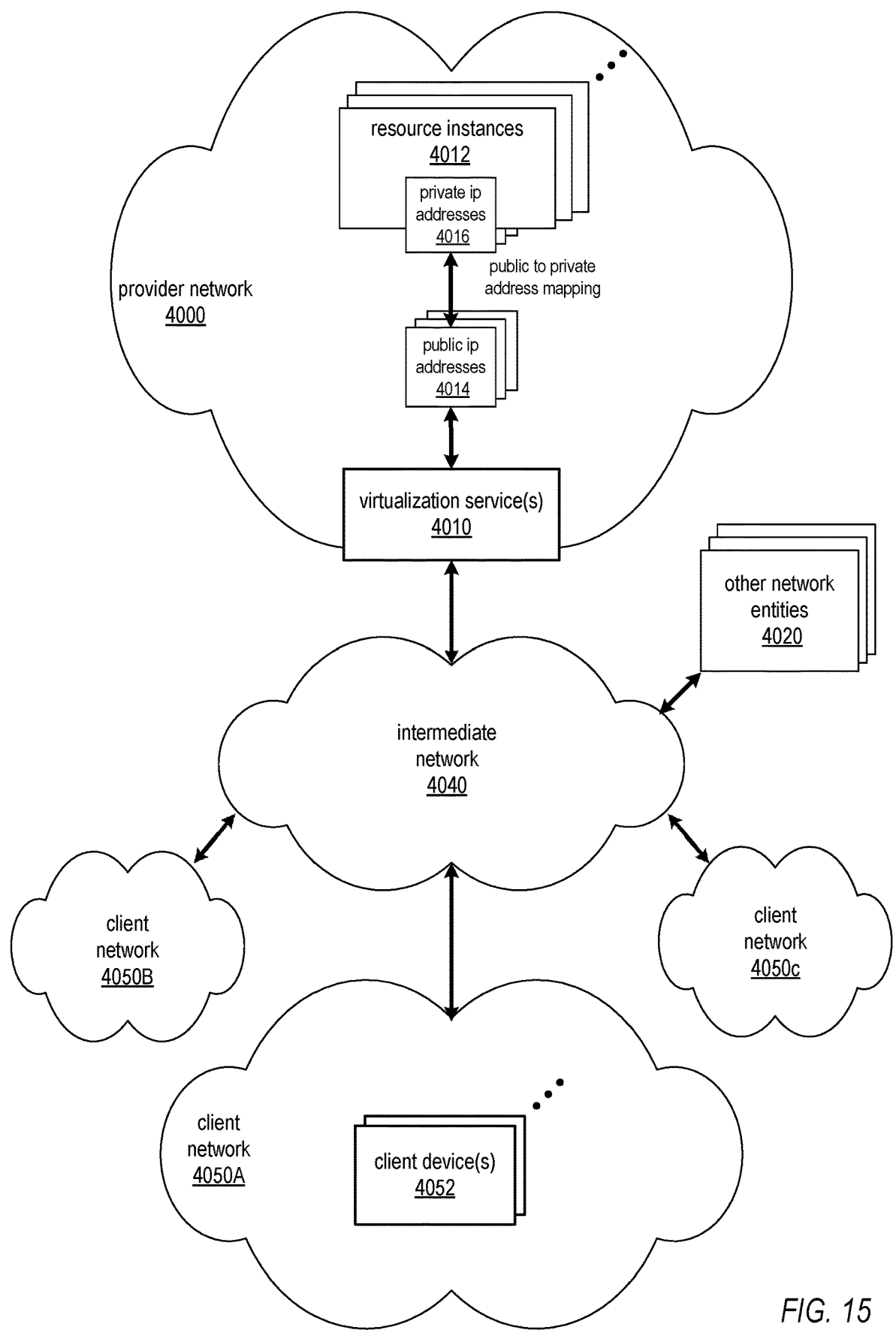
FIG. 15 illustrates an example provider network environment, according to some embodiments.

FIG. 15 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 16:
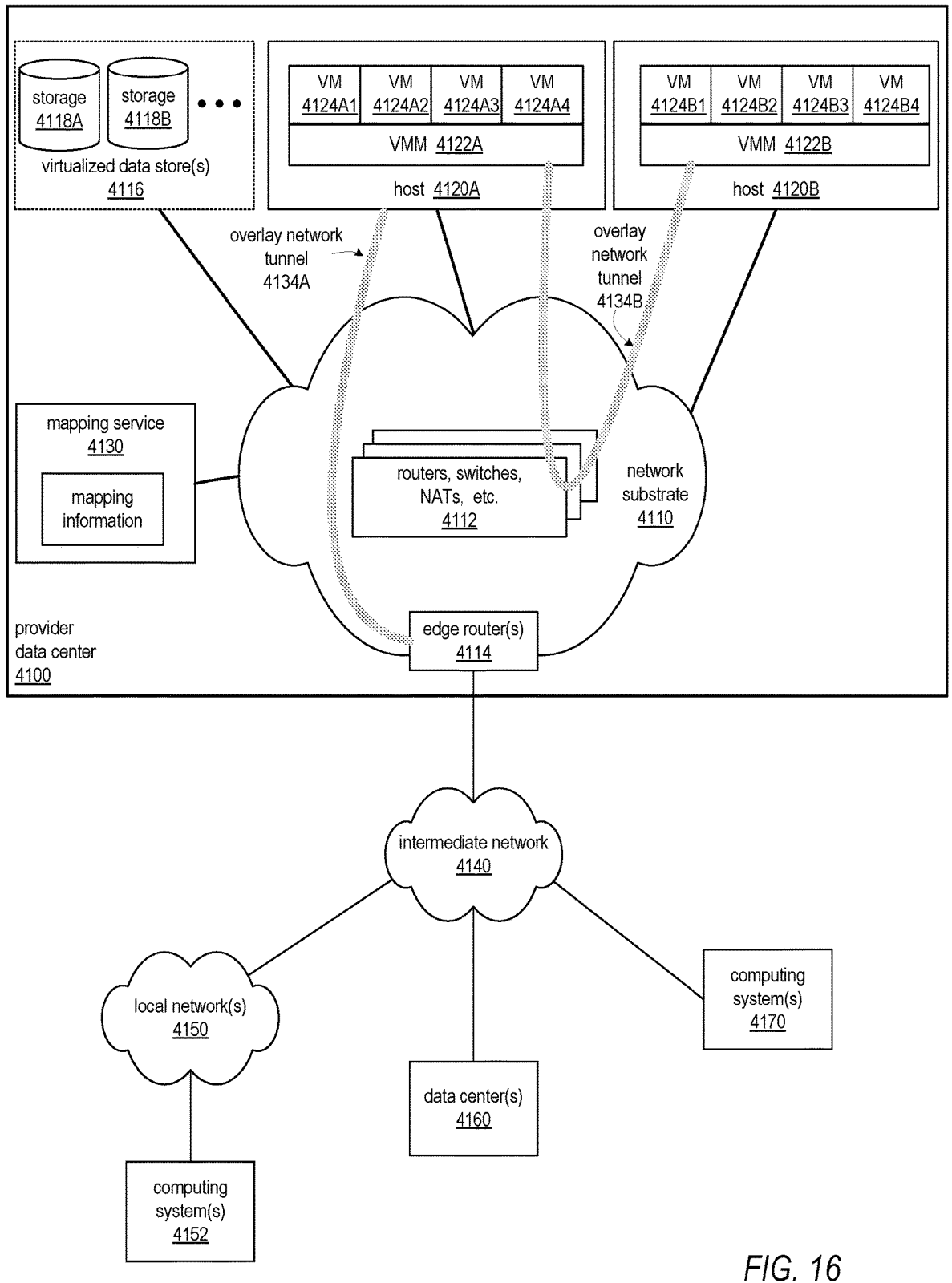
FIG. 16 illustrates an example data center that implements an overlay network on a network substrate using IP tunneling technology, according to some embodiments.

FIG. 16 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 16) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 16, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 16, at least some networks in which embodiments may be implemented may include hardware virtualization technology that enables multiple operating systems to run concurrently on a host computer (e.g., hosts 4120A and 4120B of FIG. 16), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 16 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 17:
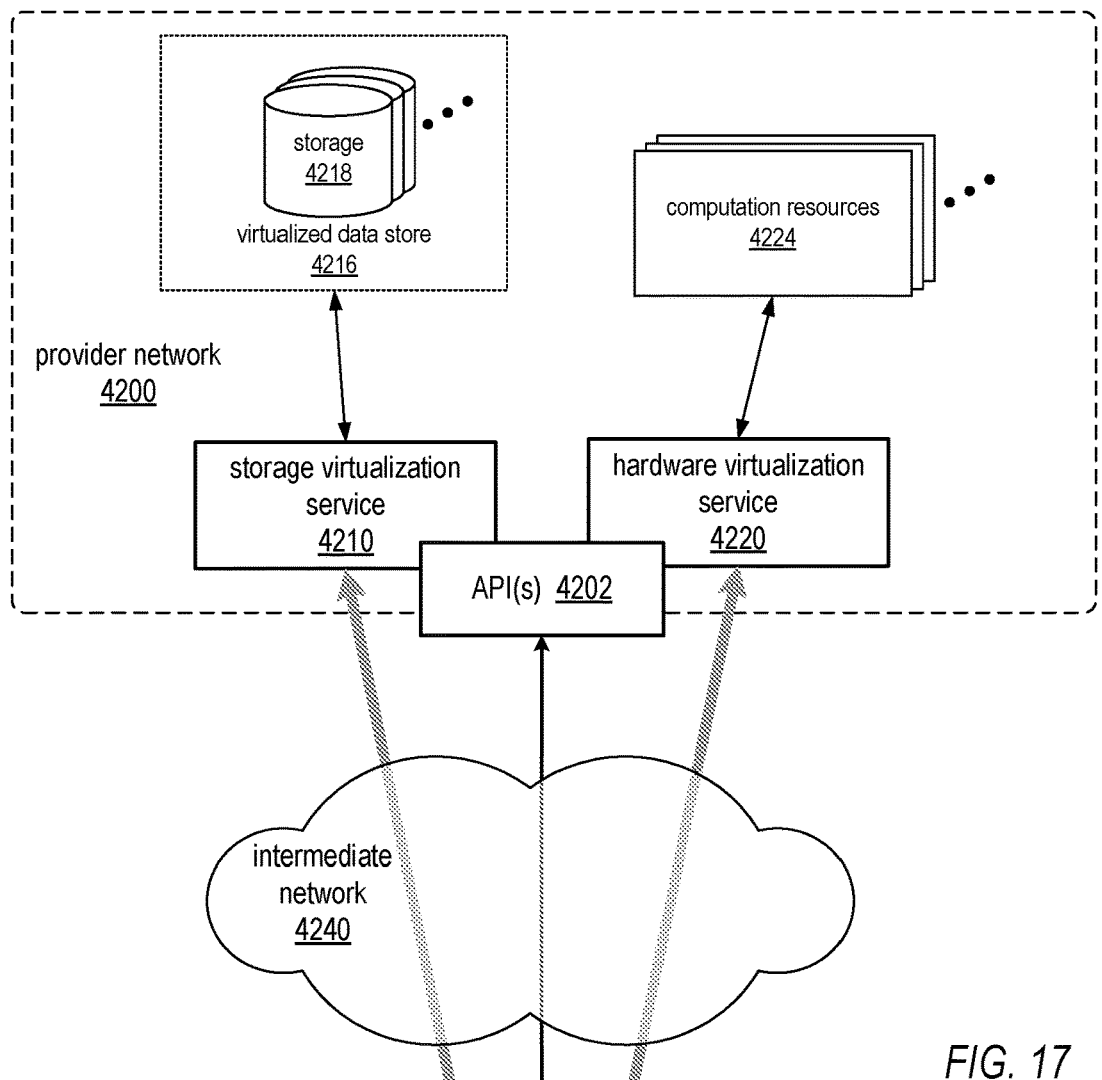
FIG. 17 is a block diagram of an example provider network that provides a storage virtualization service and a hardware virtualization service to clients, according to some embodiments.
Figure 17:
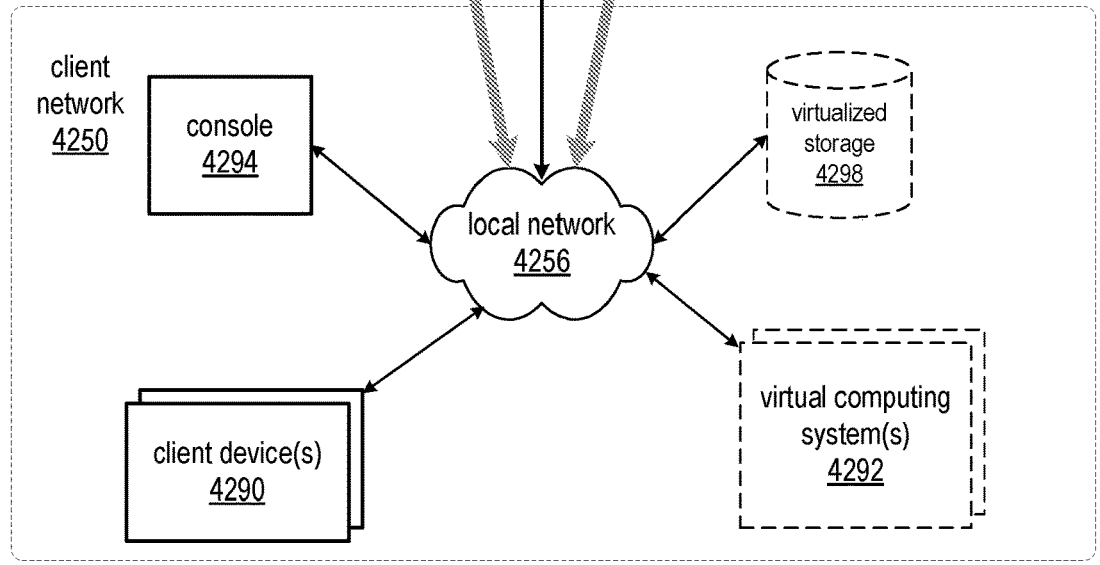

FIG. 17 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 17, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 18:
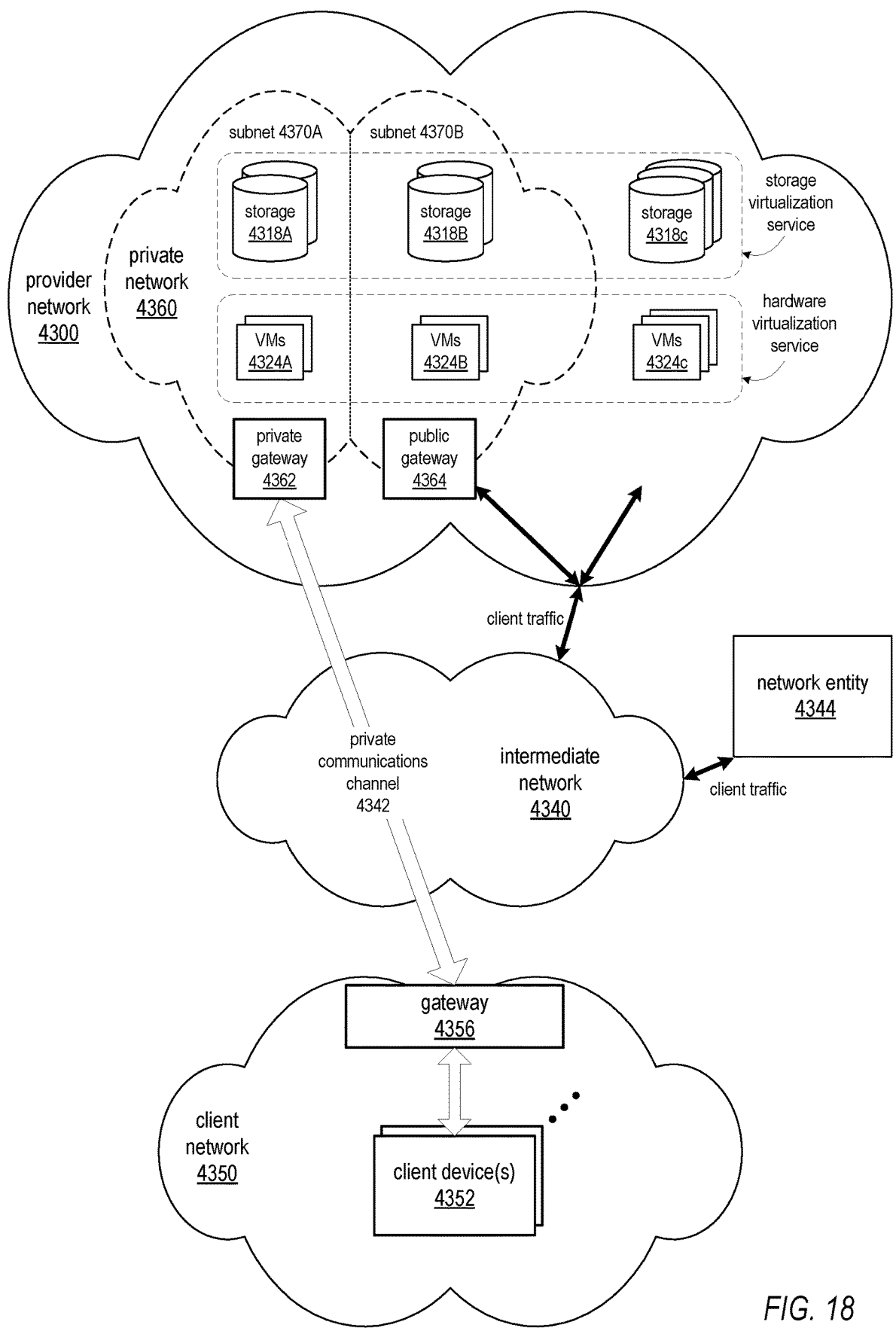
FIG. 18 illustrates an example provider network that provides virtual networks to at least some clients, according to some embodiments.

FIG. 18 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 18 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 18 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 19:
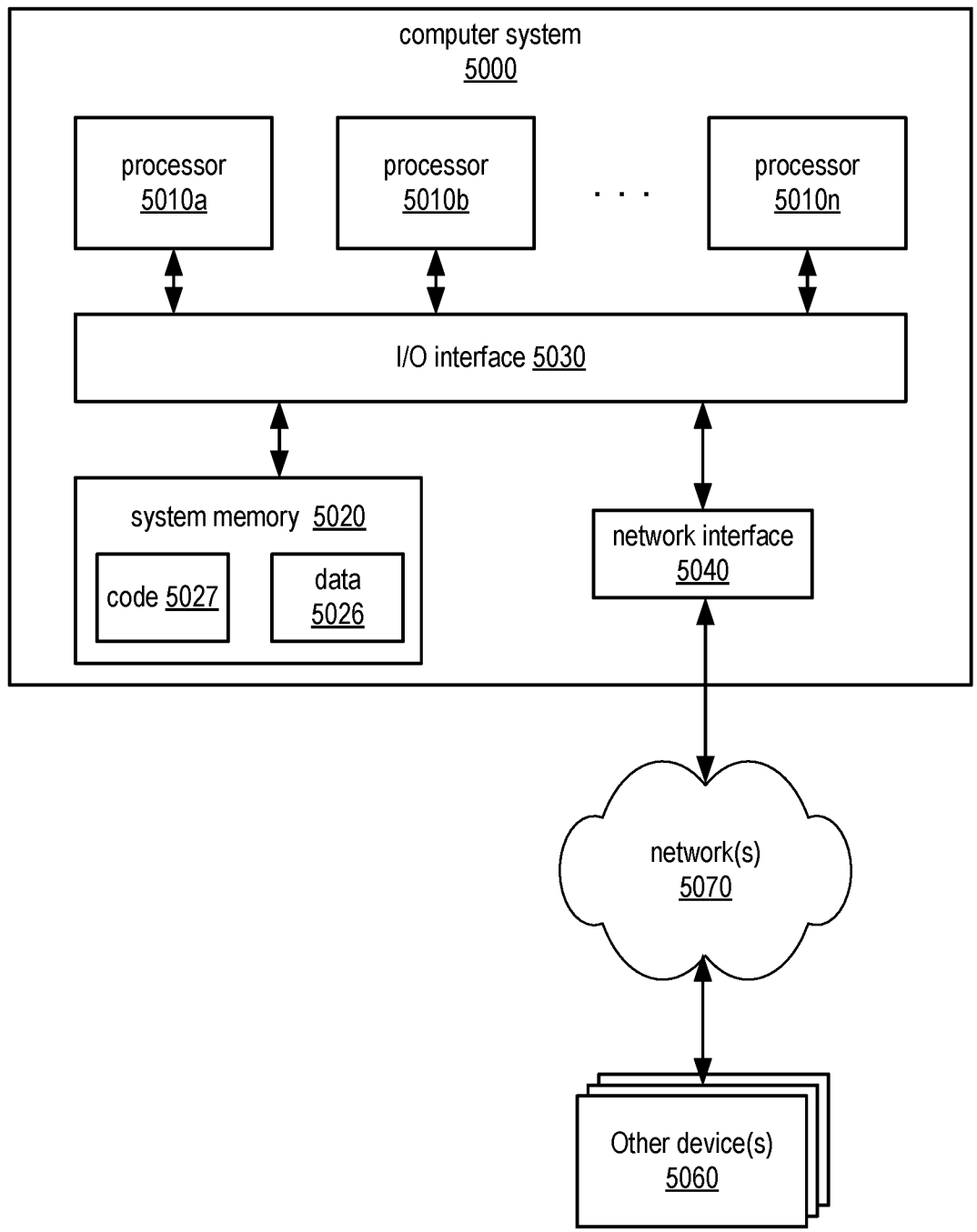
FIG. 19 is a block diagram illustrating an example computer system that may be used in some embodiments.

In some embodiments, a system that implements a portion or all of the methods and apparatus for reconfiguring host devices in provider network environments as described herein may include a general-purpose computer system that includes or is configured to access one or more computer-accessible media, such as computer system 5000 illustrated in FIG. 19. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 19 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 18, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 14 for reconfiguring host devices in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
receiving, by a control plane of a first regional network from a first private network peering interface, input specifying an inter-region peering request for a first private network in the first regional network and a second private network in a second regional network;
sending, by the control plane of the first regional network, a first peering record indicating the inter-region peering request to a control plane of the second regional network;
sending, by the control plane of the second regional network, the inter-region peering request to a second private network peering interface;
receiving, by the control plane of the second regional network from the second private network peering interface, a response to the inter-region peering request;
sending, by the control plane of the second regional network, a second peering record indicating a response to the inter-region peering request to the control plane of the first regional network; and sending, by the control plane of the first regional network, the response to the inter-region peering request to the first private network peering interface.

2. The method of claim 1, wherein the first private network peering interface is on a first console, and wherein the second private network peering interface is on a second console.

3. The method of claim 1, wherein the inter-region peering request is one of:
a create peering request to request an inter-region peering between the first virtual private network on the first regional network and the second virtual private network on the second regional network;
an accept peering request to accept a requested inter-region peering between the first virtual private network on the first regional network and the second virtual private network on the second regional network;
a reject peering request to reject a requested inter-region peering between the first virtual private network on the first regional network and the second virtual private network on the second regional network; or
a delete peering request to delete an existing inter-region peering between the first virtual private network on the first regional network and the second virtual private network on the second regional network.

4. The method of claim 1, wherein the inter-region peering request is a create peering request to request an inter-region peering between the first virtual private network on the first regional network and the second virtual private network on the second regional network, wherein the response to the inter-region peering request accepts the create peering request, and wherein the method further comprises provisioning, by the first control plane of the first regional network, the inter-region peering for the first virtual private network on the first regional network in response to receiving the second peering record.

5. The method of claim 1, further comprising:
signing and encrypting the first peering record prior to sending the first peering record to the control plane of the second regional network; and
signing and encrypting the second peering record prior to sending the second peering record to the control plane of the first regional network.

6. The method of claim 1, wherein the inter-region peering request is a create peering request to request an inter-region peering between the first virtual private network on the first regional network and the second virtual private network on the second regional network, the method further comprising:
receiving, by the control plane of the first regional network from the first private network peering interface, additional input specifying one or more of:
one or more ports on the virtual private networks for the inter-region peering;
one or more route definitions for the inter-region peering;
one or more network protocols for the inter-region peering;
one or more security protocols for the inter-region peering; and
bandwidth for the inter-region peering.

7. The method of claim 1, further comprising:
sending, by the control plane of the second regional network to the control plane of the first regional network in response to receiving the first peering record and prior to receiving the response to the inter-region peering request, an indication that the inter-region peering request is pending; and sending, by the control plane of the first regional network, an indication that the inter-region peering request is pending to the first private network peering interface.

8. A provider network, comprising:

two or more regional networks each comprising:
- one or more virtual private networks each including one or more virtual machines executing on host devices on its respective regional network; and
- a control plane implemented by one or more devices that performs network configuration and management for its respective regional network;

wherein the control plane of the first regional network of the two or more regional networks performs:
- receive, from a first private network peering interface, input specifying an inter-region peering request for a first private network in the first regional network and a second private network in a second regional network of the two or more regional networks;
- send a first peering record indicating the inter-region peering request to a control plane of the second regional network;
- receive a second peering record indicating a response to the inter-region peering request from the control plane of the second regional network; and
- send the response to the inter-region peering request to the first private network peering interface.

9. The provider network of claim 8, wherein the control plane of the second regional network of the two or more regional networks performs:
- receive the first peering record indicating the inter-region peering request;
- send the inter-region peering request to a second private network peering interface;
- receive, from the second private network peering interface, a response to the inter-region peering request; and
- send, by the control plane of the second regional network, the second peering record indicating the response to the inter-region peering request to the control plane of the first regional network.

10. The provider network of claim 9, wherein the first private network peering interface is on a first console, and wherein the second private network peering interface is on a second console.

11. The provider network of claim 8, wherein the inter-region peering request is one of:
- a create peering request to request an inter-region peering between the first virtual private network on the first regional network and the second virtual private network on the second regional network;
- an accept peering request to accept a requested inter-region peering between the first virtual private network on the first regional network and the second virtual private network on the second regional network;
- a reject peering request to reject a requested inter-region peering between the first virtual private network on the first regional network and the second virtual private network on the second regional network; or
- a delete peering request to delete an existing inter-region peering between the first virtual private network on the first regional network and the second virtual private network on the second regional network.

12. The provider network of claim 8, wherein the inter-region peering request is a create peering request to request an inter-region peering between the first virtual private network on the first regional network and the second virtual private network on the second regional network, wherein the response to the inter-region peering request accepts the create peering request, and wherein the first control plane of the first regional network further performs provisioning of the inter-region peering for the first virtual private network on the first regional network in response to receiving the second peering record.

13. The provider network of claim 8, wherein the control plane of the first regional network further performs:
- receive, from the first private network peering interface, additional input specifying one or more of:
  - one or more ports on the virtual private networks for the inter-region peering;
  - one or more route definitions for the inter-region peering;
  - one or more network protocols for the inter-region peering;
  - one or more security protocols for the inter-region peering; and
  - bandwidth for the inter-region peering.

14. The provider network of claim 8,
wherein, in response to receiving the first peering record and prior to receiving the response to the inter-region peering request, the control plane of the second regional network sends an indication that the inter-region peering request is pending to the control plane of the first regional network; and wherein the control plane of the first regional network sends an indication that the inter-region peering request is pending to the first private network peering interface.

15. One or more non-transitory computer-readable storage media storing program instructions that when executed on or across one or more processors on a provider network causes the one or more processors to perform:
- receive, at a first regional network of the provider network from a first private network peering interface, input specifying an inter-region peering request for a first private network in the first regional network and a second private network in a second regional network of the provider network;
- send, from the first regional network to the second regional network, a first peering record indicating the inter-region peering request;
- receive, at the first regional network from the second regional network, a second peering record indicating a response to the inter-region peering request; and
- send the response to the inter-region peering request to the first private network peering interface.

16. The one or more non-transitory computer-readable storage media of claim 15, wherein the program instructions cause the one or more processors to further perform:
- receive, at the second regional network, the first peering record indicating the inter-region peering request;
- send the inter-region peering request to a second private network peering interface;
- receive, at the second regional network from the second private network peering interface, a response to the inter-region peering request; and
- send, from the second regional network to the first regional network, the second peering record indicating the response to the inter-region peering request.

17. The one or more non-transitory computer-readable storage media of claim 16, wherein the first private network peering interface is on a first console, and wherein the second private network peering interface is on a second console.

18. The one or more non-transitory computer-readable storage media of claim 15, wherein the inter-region peering request is one of:
- a create peering request to request an inter-region peering between the first virtual private network on the first regional network and the second virtual private network on the second regional network;
- an accept peering request to accept a requested inter-region peering between the first virtual private network on the first regional network and the second virtual private network on the second regional network;
- a reject peering request to reject a requested inter-region peering between the first virtual private network on the first regional network and the second virtual private network on the second regional network; or
- a delete peering request to delete an existing inter-region peering between the first virtual private network on the first regional network and the second virtual private network on the second regional network.

19. The one or more non-transitory computer-readable storage media of claim 15, wherein the inter-region peering request is a create peering request to request an inter-region peering between the first virtual private network on the first regional network and the second virtual private network on the second regional network, wherein the response to the inter-region peering request accepts the create peering request, and wherein the program instructions cause the one or more processors to further perform provisioning of the inter-region peering for the first virtual private network on the first regional network in response to receiving the second peering record.

20. The one or more non-transitory computer-readable storage media of claim 15, wherein the program instructions cause the one or more processors to further perform:
- receive, from the first private network peering interface, additional input specifying one or more of:
  - one or more ports on the virtual private networks for the inter-region peering;
  - one or more route definitions for the inter-region peering;
  - one or more network protocols for the inter-region peering;
  - one or more security protocols for the inter-region peering; and
  - bandwidth for the inter-region peering.

* * * * *